United States Patent
Leach

(10) Patent No.: US 11,323,505 B2
(45) Date of Patent: May 3, 2022

(54) COMPUTER NETWORKS FOR SELECTIVE NODE DELIVERY

(71) Applicant: Ibotta, Inc., Denver, CO (US)

(72) Inventor: Bryan W. Leach, Denver, CO (US)

(73) Assignee: IBOTTA, INC., Denver, CO (US)

( * ) Notice: Subject to any disclaimer, the term of this patent is extended or adjusted under 35 U.S.C. 154(b) by 126 days.

(21) Appl. No.: 15/927,861

(22) Filed: Mar. 21, 2018

(65) Prior Publication Data

US 2018/0295177 A1 Oct. 11, 2018

Related U.S. Application Data

(63) Continuation-in-part of application No. 13/571,150, filed on Aug. 9, 2012, now abandoned, which is a continuation of application No. 13/527,395, filed on Jun. 19, 2012, now abandoned.

(60) Provisional application No. 61/498,703, filed on Jun. 20, 2011.

(51) Int. Cl.
| | |
|---|---|
| *H04L 29/08* | (2006.01) |
| *G06Q 30/06* | (2012.01) |
| *H04L 67/06* | (2022.01) |
| *H04L 67/50* | (2022.01) |
| *H04L 67/01* | (2022.01) |
| *G06K 9/00* | (2022.01) |
| *G06K 9/46* | (2006.01) |

(52) U.S. Cl.
CPC .......... *H04L 67/06* (2013.01); *G06K 9/00442* (2013.01); *G06Q 30/0641* (2013.01); *H04L 67/22* (2013.01); *H04L 67/42* (2013.01); *G06K 9/46* (2013.01); *G06K 2209/01* (2013.01)

(58) Field of Classification Search
CPC ......... H04L 67/06; H04L 67/22; H04L 67/42; H04L 29/08; H04L 29/06; G06Q 30/0641; G06Q 30/06; G06K 9/00442; G06K 2209/01; G06K 9/46; G06K 9/00
USPC ............... 709/217; 340/16.1; 375/219; 711/1
See application file for complete search history.

(56) References Cited

U.S. PATENT DOCUMENTS

| | | |
|---|---|---|
| 4,674,041 A | 6/1987 | Lemon et al. |
| 4,996,642 A | 2/1991 | Hey |
| 5,201,010 A | 4/1993 | Deaton et al. |
| 5,642,485 A | 6/1997 | Deaton et al. |

(Continued)

FOREIGN PATENT DOCUMENTS

WO WO-2012177766 A1 12/2012

OTHER PUBLICATIONS

U.S. Appl. No. 13/571,150, Final Office Action dated May 1, 2013.
(Continued)

*Primary Examiner* — Minh Chau Nguyen
*Assistant Examiner* — Mehulkumar J Shah
(74) *Attorney, Agent, or Firm* — Wilson Sonsini Goodrich & Rosati

(57) ABSTRACT

The computer networks provided herein may facilitate the delivery of interactive data units to selective client nodes. A client node may be associated with, and/or be accessible by, a user. The interactive data units received at a client node may be activated by the user associated with the client node. In some instances, a computer network may facilitate delivery of an interactive data unit to a client node based on the user, and/or user information, associated with the client node.

22 Claims, 20 Drawing Sheets

(56) References Cited

U.S. PATENT DOCUMENTS

| | | | |
|---|---|---|---|
| 5,649,114 A | 7/1997 | Deaton et al. | |
| 5,659,469 A | 8/1997 | Deaton et al. | |
| 5,675,662 A | 10/1997 | Deaton et al. | |
| 5,687,322 A | 11/1997 | Deaton et al. | |
| 5,774,868 A | 6/1998 | Cragun et al. | |
| 5,832,457 A | 11/1998 | O'Brien et al. | |
| 6,009,411 A | 12/1999 | Kepecs | |
| 6,026,370 A | 2/2000 | Jermyn | |
| 6,049,777 A | 4/2000 | Sheena et al. | |
| 6,076,068 A | 6/2000 | Delapa et al. | |
| 6,230,143 B1 | 5/2001 | Simons et al. | |
| 6,292,786 B1 | 9/2001 | Deaton et al. | |
| 6,484,146 B2 | 11/2002 | Day et al. | |
| 6,543,683 B2 | 4/2003 | Hoffman | |
| 6,641,037 B2 | 11/2003 | Williams | |
| 6,782,370 B1 | 8/2004 | Stack | |
| 6,827,260 B2 | 12/2004 | Stoutenburg et al. | |
| 6,862,575 B1 | 3/2005 | Anttila et al. | |
| 6,886,742 B2 | 5/2005 | Stoutenburg et al. | |
| 7,086,584 B2 | 8/2006 | Stoutenburg et al. | |
| 7,120,591 B1 | 10/2006 | Solomon et al. | |
| 7,305,129 B2 | 12/2007 | Chellapilla et al. | |
| 7,506,809 B2 | 3/2009 | Stoutenburg et al. | |
| 7,552,087 B2 | 6/2009 | Schultz et al. | |
| 7,552,094 B2 | 6/2009 | Park et al. | |
| 7,600,673 B2 | 10/2009 | Stoutenburg et al. | |
| 7,657,436 B2 | 2/2010 | Elmore et al. | |
| 7,698,171 B2 | 4/2010 | Rampell et al. | |
| 7,742,989 B2 | 6/2010 | Schultz | |
| 7,792,709 B1 | 9/2010 | Trandal et al. | |
| 7,831,481 B2 | 11/2010 | Rodriguez et al. | |
| 7,899,710 B1 | 3/2011 | Walker et al. | |
| 7,904,384 B2 | 3/2011 | Lilly et al. | |
| 8,001,046 B2 | 8/2011 | Schultz | |
| 8,046,257 B2 | 10/2011 | Wane et al. | |
| 8,095,439 B1 | 1/2012 | Harman et al. | |
| 8,112,356 B2 | 2/2012 | Schultz | |
| 8,146,810 B1 | 4/2012 | Segura | |
| 8,165,960 B2 | 4/2012 | Schultz | |
| 8,199,742 B1 | 6/2012 | Croak et al. | |
| 8,285,604 B1 | 10/2012 | Trandal et al. | |
| 9,015,277 B1 | 4/2015 | Slavin et al. | |
| 9,972,047 B1* | 5/2018 | Elliott | G06Q 30/02 |
| 10,437,840 B1* | 10/2019 | Poh | G06F 16/24578 |
| 2002/0004783 A1 | 1/2002 | Paltenghe et al. | |
| 2002/0103834 A1 | 8/2002 | Thompson et al. | |
| 2002/0152118 A1 | 10/2002 | Hadjigeorgis | |
| 2002/0153414 A1 | 10/2002 | Stoutenburg et al. | |
| 2002/0156683 A1 | 10/2002 | Stoutenburg et al. | |
| 2002/0166891 A1 | 11/2002 | Stoutenburg et al. | |
| 2002/0188559 A1 | 12/2002 | Schultz | |
| 2002/0188561 A1 | 12/2002 | Schultz | |
| 2003/0032476 A1 | 2/2003 | Walker et al. | |
| 2003/0066091 A1 | 4/2003 | Lord et al. | |
| 2004/0003402 A1* | 1/2004 | McKenna, Jr. | H04N 21/4438 725/46 |
| 2004/0049427 A1 | 3/2004 | Tami et al. | |
| 2004/0111360 A1 | 6/2004 | Albanese | |
| 2004/0181749 A1 | 9/2004 | Chellapilla et al. | |
| 2004/0238637 A1 | 12/2004 | Russell et al. | |
| 2005/0091104 A1 | 4/2005 | Abraham | |
| 2005/0240525 A1 | 10/2005 | Bagayatkar | |
| 2006/0036502 A1 | 2/2006 | Farrell | |
| 2006/0277103 A1 | 12/2006 | Fujita et al. | |
| 2007/0094088 A1 | 4/2007 | Mastie et al. | |
| 2007/0290043 A1 | 12/2007 | Russell et al. | |
| 2007/0291747 A1 | 12/2007 | Stern et al. | |
| 2008/0065490 A1 | 3/2008 | Novick et al. | |
| 2008/0073429 A1 | 3/2008 | Oesterling et al. | |
| 2008/0077506 A1* | 3/2008 | Rampell | G06Q 30/06 705/26.1 |
| 2008/0154704 A1 | 6/2008 | Flake et al. | |
| 2008/0195460 A1 | 8/2008 | Varghese | |
| 2008/0196060 A1 | 8/2008 | Varghese | |
| 2009/0281888 A1* | 11/2009 | Zai | G06Q 30/0237 705/14.25 |
| 2009/0299887 A1 | 12/2009 | Shiran et al. | |
| 2010/0106568 A1 | 4/2010 | Grimes | |
| 2010/0106569 A1 | 4/2010 | Grimes | |
| 2010/0106577 A1 | 4/2010 | Grimes | |
| 2010/0106596 A1 | 4/2010 | Grimes | |
| 2010/0121708 A1 | 5/2010 | Schultz | |
| 2010/0121723 A1 | 5/2010 | Miller et al. | |
| 2010/0318407 A1 | 12/2010 | Leff et al. | |
| 2011/0010273 A1 | 1/2011 | Lee | |
| 2011/0066497 A1 | 3/2011 | Gopinath et al. | |
| 2011/0125561 A1* | 5/2011 | Marcus | G06Q 20/32 705/14.15 |
| 2011/0166934 A1 | 7/2011 | Comay et al. | |
| 2011/0178861 A1 | 7/2011 | Georgi | |
| 2011/0184822 A1 | 7/2011 | Matkovic | |
| 2011/0208586 A1 | 8/2011 | Joa et al. | |
| 2011/0258024 A1 | 10/2011 | Prince | |
| 2011/0282748 A1 | 11/2011 | Ciurea | |
| 2012/0072280 A1 | 3/2012 | Lin | |
| 2012/0143666 A1 | 6/2012 | Carrion et al. | |
| 2012/0233011 A1* | 9/2012 | Barlow | G06Q 30/08 705/26.3 |
| 2012/0284107 A1 | 11/2012 | Gernaat et al. | |
| 2012/0310831 A1* | 12/2012 | Harris | G06Q 30/02 705/44 |
| 2012/0323656 A1 | 12/2012 | Leach | |
| 2012/0323663 A1 | 12/2012 | Leach | |
| 2015/0170181 A1 | 6/2015 | Sampson et al. | |
| 2015/0213480 A1 | 7/2015 | Slavin et al. | |
| 2018/0075224 A1 | 3/2018 | Yang et al. | |

OTHER PUBLICATIONS

U.S. Appl. No. 13/571,150, Non Final Office Action dated Nov. 20, 2012.

Office Action dated Mar. 6, 2014 for U.S. Appl. No. 13/571,150.

Office Action dated Jun. 30, 2017 for U.S. Appl. No. 13/571,150.

U.S. Appl. No. 13/571,150 Office Action dated Feb. 26, 2018.

U.S. Appl. No. 12/950,103, Non-Final Office Action dated Sep. 6, 2013, 26 pgs.

U.S. Appl. No. 13/527,395, Examiner Interview Summary dated Apr. 24, 2013, 3 pgs.

U.S. Appl. No. 13/527,395, Final Office Action dated Jun. 13, 2013, 24 pgs.

U.S. Appl. No. 13/527,395, Non-Final Office Action dated Nov. 26, 2012, 22 pgs.

U.S. Appl. No. 13/527,395, Response filed Apr. 26, 2013 to Non Final Office Action dated Nov. 26, 2013, 18 pgs.

Arar, Yardena, "Online Bargains: How to Use Groupon and Its Competitors", [Online]. Retrieved from the Internet: <https://www.pcworld.com/printable/article/id,219645/printable.html>, (Feb. 15, 2011), 4 pgs.

Belkin, N. J., et al., "Information Filtering and Information Retrieval: Two Sides of the Same Coin?", Communications of the ACM, 35, (Dec. 1992), 29-38.

Breuel, Thomas M, "Robust Least Square Baseline Finding using a Branch and Bound Algorithm", tbreuel@parc.xerox.com, (2002), 8 pgs.

Breuel, Thomas M, "Two Geometric Algorithms for Layout Analysis", Xerox Palo Alto Research Center, (2002), 12 pgs.

Ewing, Tom, et al., "The Giants Among Us", 2012 Stan. Tech. L. Rev. 1 Copyright © 2011 Stanford Technology Law Review., (2011), 63 pgs.

Fenton, William, "iPhone Adds Google Shopper to its Cart", Copyright (c) 2012 Ziff Davis Inc., [Online], Retrieved from the Internet:<URL: http://www.pcmag.com/article2/0,2817,2379221,00.asp>, (Feb. 2, 2011), 1 pg.

Gibbs, Mark, "Shoeboxed: Making Business Life Less Tedious", [Online], Retrieved from the Internet:<URL:https://www.pcworld.com/printable/article/id,174447/printable.html>, (Oct. 27, 2009), 1 pg.

(56) References Cited

OTHER PUBLICATIONS

Gigrubg, Nancy, Visa, MasterCard and AmEx Join Google Wallet Competitor, [Online]. Retrieved from the Internet:< URL: https://www.pcworld.com/printable/article/id,236030/printable.html>, (Jul. 19, 2011), 1 pg.

"Grocery Gadget® Shopping List Now Available for BlackBerry®", HooKMedia, [Online]. Retrieved from the Internet:< URL: http://www.prlog.org/11391540-grocery-gadget-shopping-list-now-available-for-blackberry.html>, (Mar. 22, 2011), 2 pgs.

"Grocery iQ Adds Android to Its "List—, BusinessWire, [Online]. Retrieved from the Internet:< URL: http://www.businesswire.com/news/home/20100309005814/en>, (Mar. 6, 2010), 4 pgs.

He, J, et al., "A Comparison of Binarization Methods for Historical Archive Documents", Proceedings of the 2005 Eight International Conference on Document Analysis and Recognition (ICDAR'05), (2005), 5 pgs.

Hill, Kashmir, "How Target Figured Out A Teen Girl Was Pregnant Before Her Father Did", [Online]. Retrieved from the Internet:< URL: http://www.forbes.com/sites/kashmirhill/2012/02/16/how-target- . . .>, (Feb. 16, 2012), 3 pgs.

"Shopping Trends Analysis Tool Now Available; Flixoft Enhances Grocery Gadget® Web Portal", © Copyright 1997-2012, Vocus PRW Holdings, LLC., [Online]. Retrieved from the Internet:< URL: http://www.prweb.com/printer/5052114.htm>, (Feb. 10, 2011), 2 pgs.

International Application Serial No. PCT/US2012/043354, International Preliminary Report on Patentability dated Jun. 28, 2013, 14 pgs.

International Application Serial No. PCT/US2012/043354, Invitation to Correct Defects mailed Jul. 5, 2012, 4 pgs.

International Application Serial No. PCT/US2012/043354, Response filed Sep. 5, 2012 to Invitation to Correct Defects mailed Jul. 5, 2012, 21 pgs.

International Application Serial No. PCT/US2012/043354, Search Report dated Sep. 13, 2012, 3 pgs.

International Application Serial No. PCT/US2012/043354, Written Opinion dated Sep. 13, 2012, 11 pgs.

Klein, Jennifer, "Perceptual Distortions", Visual Studies Senior Thesis, (2006), 44 pgs.

Knight, Kristina, Survey finds Americans shopping smarter, not harder, BizReport, [Online]. Retrieved from the Internet:< URL: http://www.bizreport.com/2011/04/survey->, (Apr. 5, 2011), 1 pg.

"Lemon.com Debuts With Receipt Organizer and Spending Management Tools", © 2008 SYS-CON Media Inc., [Online]. Retrieved from the Internet:< URL: http://www.sys-con.com/node/2020058/print>, (Accessed Jul. 30, 2012), 2 pgs.

Miller, Claire Cain, "Visa Invests in Square for Mobile Payments", Copyright 2012 The New York Times Company, [Online]. Retrieved from the Internet:< URL: http://bits.blogs.nytimes.com/2011/04/27/visa-invests-in-square- . . .>, (Apr. 27, 2011), 2 pgs.

Yin, Sara, "What Google Wallet Looks Like at American Eagle Out", Copyright (c) 2012 Ziff Davis Inc., [Online]. Retrieved from the Internet: <http://www.pcmag.com/article2/0,2817,2393207,00.asp>, (Sep. 19, 2011), 2 pgs.

Co-pending U.S. Appl. No. 15/592,062, filed May 10, 2017.
Co-pending U.S. Appl. No. 16/133,399, filed Sep. 17, 2018.
Office Action dated Jul. 28, 2017 for U.S. Appl. No. 15/592,062.
U.S. Appl. No. 13/527,395 Office Action dated May 29, 2014.
U.S. Appl. No. 15/592,062 Office Action dated Mar. 15, 2018.
U.S. Appl. No. 16/133,399 Office Action dated May 8, 2020.
U.S. Appl. No. 16/133,399 Office Action dated Feb. 24, 2021.

* cited by examiner

COMPUTER NETWORKS FOR SELECTIVE NODE DELIVERY

CROSS REFERENCE

This application is a continuation-in-part of U.S. patent application Ser. No. 13/571,150, filed Aug. 9, 2012, which is a continuation application of U.S. patent application Ser. No. 13/527,395, filed Jun. 19, 2012, which claims the benefit of U.S. Provisional Application No. 61/498,703, filed Jun. 20, 2011, each of which applications is entirely incorporated herein by reference.

BACKGROUND

A computer network may facilitate the exchange, and/or delivery, of data packets between multiple client nodes. For example, each client node may be associated with a user. In some instances, the distribution of data from one client node to different client nodes may be based at least in part on the users, and user information, associated with the different client nodes.

SUMMARY

Recognized herein is a need for computer networks for selective node delivery. The computer networks provided herein may facilitate the delivery of interactive data units to selective client nodes. A client node may be associated with, and/or be accessible by, a user. The interactive data units received at a client node may be activated or engaged by the user associated with the client node. In some instances, a computer network may facilitate delivery of an interactive data unit to a client node based on the user, and/or user information, associated with the client node.

In an aspect, provided is a method for delivering interactive data to selective nodes in a computer network, comprising: receiving, over the computer network, a plurality of interactive data units from one or more interactive data providers, wherein the plurality of interactive data units is activateable at client nodes, which client nodes comprise mobile electronic devices of a plurality of users, and wherein the plurality of interactive data units comprises activation parameters; aggregating user data for each user of the plurality of users, wherein each of the plurality of users is associated with a client node comprising a mobile electronic device, and wherein the user data comprises item-level data obtained from a physical form by the mobile electronic device; based at least in part on processing the activation parameters of the plurality of interactive data units with the user data, selecting at least one of the plurality of users to receive an interactive data unit of the plurality of interactive data units; and delivering, over the computer network, the interactive data unit to at least one client node associated with the at least one of the plurality of users.

In some embodiments, the method further comprises, at the at least one client node, activating the interactive data unit upon satisfaction of an activation parameter of the interactive data unit by the at least one of the plurality of users.

In some embodiments, the method further comprises transmitting activation data to one or more client nodes associated with an interactive data provider of the one or more interactive data providers providing the interactive data unit.

In some embodiments, the user data for the at least one of the plurality of users comprise activity data that satisfies the activation parameter of the interactive data unit.

In some embodiments, the method further comprises generating an image of the physical form and performing optical character recognition on the image to obtain the item-level data.

In some embodiments, the method further comprises storing the item-level data for subsequent analysis.

In some embodiments, the method further comprises mapping at least a portion of the item-level data to reference data and generating normalized item-level data.

In some embodiments, the method further comprises receiving modifications to the plurality of interactive data units from the one or more interactive data providers and delivering the modifications to the at least one client node associated with the at least one of the plurality of users.

In another aspect, provided is a computer system for delivering interactive data to selective nodes, comprising: a network adaptor in communication with client nodes over a network, which client nodes comprise mobile electronic devices of users, wherein each of the client nodes is associated with a user of a plurality of users and user data stored in memory, wherein the user data comprises item-level data obtained from a physical form by a mobile electronic device of the user; a plurality of interactive data units stored in memory, wherein the plurality of interactive data units is activateable at the client nodes, and wherein the plurality of interactive data units comprises activation parameters; and one or more processors, individually or collectively, configured to use the network adaptor to deliver an interactive data unit of the plurality of interactive data units to a client node of the client nodes based on processing activation parameters for the interactive data unit with the user data of the user associated with the client node.

In some embodiments, the user data of the user comprises activity data that satisfies the activation parameters of the interactive data unit.

In some embodiments, the one or more processors, individually or collectively, are configured to transmit activation data to one or more client nodes associated with an interactive data provider providing the interactive data unit.

In some embodiments, the one or more processors, individually or collectively, are configured to obtain the item-level data from at least one of an image of the physical form and optical character recognition of the image.

In some embodiments, the processing comprises mapping at least a portion of the item-level data to reference data to generate normalized item-level data, and processing the normalized item-level data with the activation parameters for the interactive data unit.

In some embodiments, the one or more processors, individually or collectively, are configured to receive modifications to the interactive data unit from an interactive data provider and deliver the modifications to the client node associated with the user.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
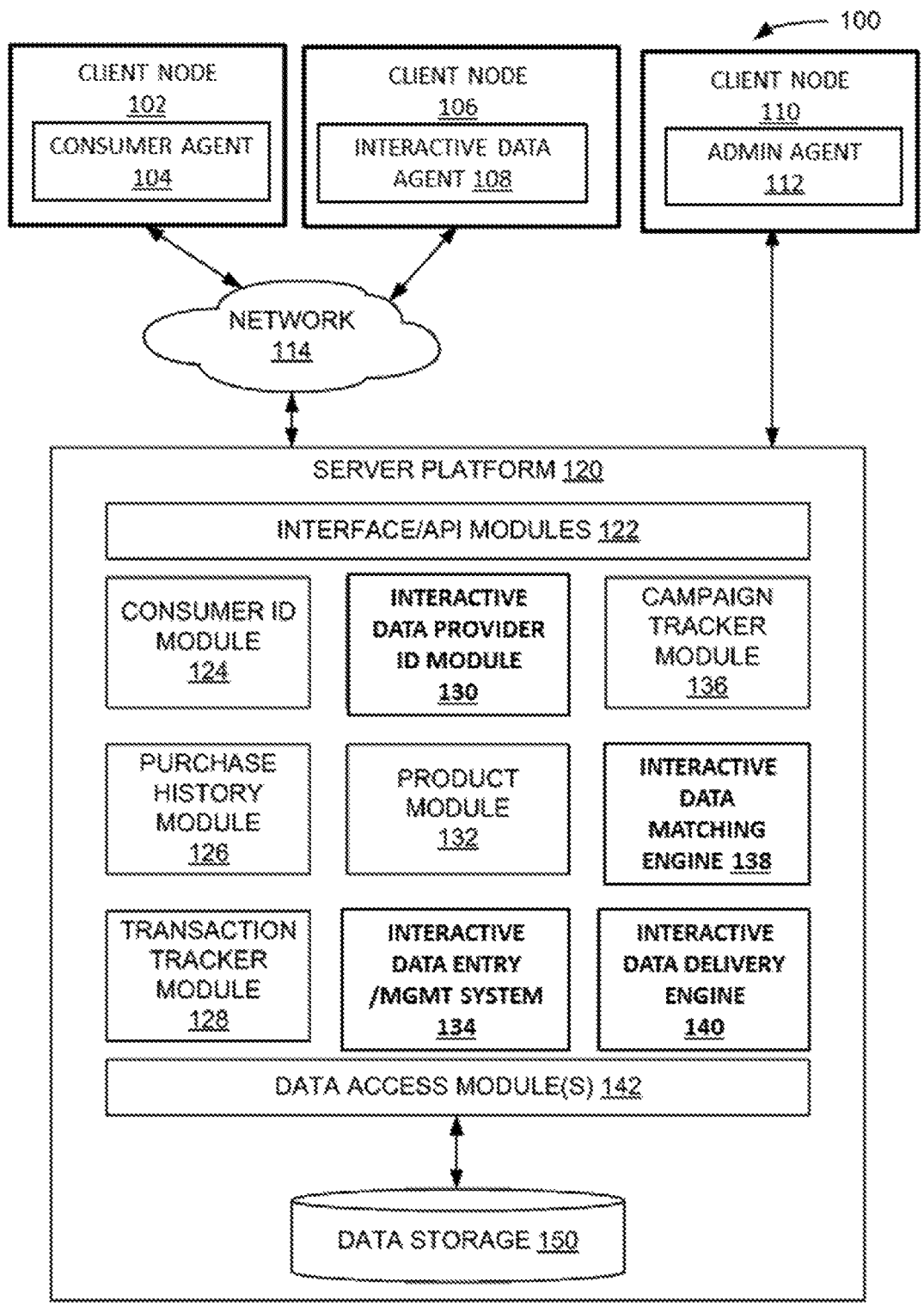
FIG. 1 is a block diagram of an example system having a client-server architecture for a server platform capable of employing at least some of the systems and methods described herein.

FIG. 1 is a block diagram depicting an example system 100, according to one exemplary embodiment, having a client-server architecture and network configured to perform the various methods described herein. A platform (e.g., machines and software, possibly interoperating via a series of network connections, protocols, application-level interfaces, and so on), in the exemplary form of a server platform 120, provides server-side functionality via a communication network 114 (e.g., the Internet or other types of wide-area networks (WANs), such as wireless networks or private networks with additional security appropriate to the tasks performed by a user) to one or more client nodes 102, 106, 110. FIG. 1 illustrates, for example, a client node 102 hosting a consumer agent 104, thus allowing a consumer or customer user to access those functions of the server platform 120 applicable to a consumer user, including, for example, transaction data storage, interactive data receipt and processing, and so on. In some instances, an intermediary acting on behalf of a consumer user or group of consumer users may access server platform 120 via the same interface as the consumer client node 102. For example, an institution that holds consumer item-level data (e.g., a bank, a mobile payment provider, or the like) may use the server platform 120 to present its users with interactive data generated by the system 100. Such interactive data may be delivered to the user electronically, such as through a network (e.g., the Internet or an intranet). Delivery may be through a wired or wireless mode of communication. The interactive data may include, without limitation, a form that is intended to solicit user response or a form that is intended to elicit user activity or response. Examples of interactive data include, without limitation, notifications, offers and alerts.

A client node (e.g., client node 102) may be a client system. For example, a client node may comprise a user device (e.g., mobile electronic device, stationary electronic device, etc.). A node may be associated with, and/or be accessible to, a user. In another example, a client node may be a computing device (e.g., server) accessible to, and/or associated with, an individual or entity. A node may comprise a network module (e.g., network adaptor) configured to transmit and/or receive data. Via the nodes in the computer network, multiple users and/or servers may communicate and exchange data, such as interactive data units.

Another client node 106 hosts an interactive data agent 108 that facilitates use of the server platform 120 applicable to users associated with, for example, manufacturers, merchants, retailers, and so on, for specifying, tracking, and otherwise managing interactive data. A further client node 110 may include an administrator agent 112, thus allowing access to the server platform 120 for development, maintenance, upgrade, and associated activities related to the overall operation and control of the server platform 120. Examples of the client nodes 102, 106, 110 may include any of a number of computing devices, such as desktop and laptop computers, tablet computers, smart phones and other mobiles communication devices, and so on.

As shown in FIG. 1, the client node 110 associated with the administrator agent 112 may be coupled more directly to the server platform 120, thus circumventing the network 114. For example, the client node 110 may be co-located with the server platform 120, coupled thereto via a local network interface. In another example, the client node 110 may communicate with the server platform 120 via a private or public network system, such as the network 114.

At least some of the embodiments described herein with respect to the system 100 of FIG. 1 provide various techniques for generating, and delivering to selective client nodes, interactive data units which are activateable, or otherwise engageable, by user input, user activity, and/or user response. For example, the interactive data units may be activateable by user activity such as the purchase of products, services, and the like. The activation of an interactive data unit may output the delivery of a value to a client. For example, the value may be a credit (e.g., financial credit, rewards, points, value, etc.) transmitted to a user's account. In some instances, a user may receive, or redeem, the value by activating the interactive data unit. An interactive data unit may be personalized or tailored to the customer receiving the interactive data unit at the selected client node (e.g., user device). In the examples described below, the system 100 may receive and aggregate transaction data, including item-level data about purchases, from a number of different data sources. These data sources may include, but are not limited to, paper forms (e.g., documents, receipts, notes, slips, etc.) held by customer users that specify individual items that have been obtained, electronic item-level transaction data provided by merchant users (e.g., retailers), and electronic item-level transaction data provided by payment provider systems. Individual items may have been obtained through purchase. Other examples of sources containing such item-level transaction data include electronic forms held by customer users or other parties and data collected by third-party transaction data aggregators. In some examples, this transaction data may be mapped to more standardized product data to identify with a degree of specificity the individual products that have been purchased. The transaction data may then be compared against potential interactive data units supplied by users associated with manufacturers, retailers, consumer promotion agencies, and other entities. In one example, if the transaction data of a customer user matches one or more potential interactive data units, such interactive data units may then be delivered to the client node of the customer user. The customer user may then activate the interactive data unit, resulting in some benefit being conferred on the customer user, such as a discount in the purchase of another product, a cash disbursement, an account credit, or the like.

In at least some examples, the server platform 120 may be one or more computing devices or systems, storage devices, and other components that include, or facilitate the operation of, various execution modules depicted in FIG. 1. These modules may include, for example, interface/API modules 122, a consumer identifier module 124, a purchase history module 126, a transaction tracker module 128, an interactive data provider identifier module 130, a product module 132, an interactive data entry/management system 134, a campaign tracker module 136, an interactive data matching engine 138, an interactive data delivery engine 140, and one or more data access modules 142. Each of these modules is described in greater detail below.

To facilitate communication between the client nodes 102, 106, 110 and the server platform 120, the server platform 120 includes interface/API modules 122, which may provide a web interface, an API, or another type of interface facilitating access by the client nodes 102, 106, 110 to the various modules 124-142 of the server platform 120. Some specific examples of the interface/API modules 122 are discussed below in conjunction with FIGS. 2A through 2C.

Data access modules 142 may facilitate access to data storage 150 of the server platform 120 by any of the remaining modules 122-140 of the server platform 120. In one example, one or more of the data access modules 142 may be database access modules, or may be any kind of data access module capable of storing data to, and/or retrieving data from, the data storage 150 according to the needs of the particular module 122-140 employing the data access modules 142 to access the data storage 150. Examples of the data storage 150 include, but are not limited to, one or more data storage components, such as magnetic disk drives, optical disk drives, solid state disk (SSD) drives, and other forms of nonvolatile and volatile memory components.

The consumer identifier module 124 may manage identifying user information for each consumer user accessing the server platform 120 from a client node, possibly including, but not limited to, actual names, usernames, passwords, contact information, and additional information pertaining to the consumer users. In some examples, this additional information may include user preference information, demographic information, previous purchase information, and other data related to the particular user. Uses for these types of information are described in greater detail below. Similarly, the interactive data provider identifier module 130 may manage identifying information for users representing a manufacturer, merchant, retailer, or similar entity that accesses the server platform 120. Analogous to the consumer identifier module 124, the interactive data provider identifier module 130 may manage names, usernames, passwords, contact information, and other information pertaining to the users representing a manufacturer or other entity. In one implementation, the identifying information associated with each consumer user or other user may be stored to, and retrieved from, one or more components of the data storage 150.

Continuing with FIG. 1, the purchase history module 126 may retrieve, store, and otherwise aggregate or manage item-level transaction data generated by multiple sources for a plurality of consumer users. As mentioned earlier, such data may be received from a number of sources, such as paper forms held by the consumer user; electronic transaction data provided by a merchant user, a payment service provider, and a third-party aggregator; loyalty website data; and so on as described above.

The transaction tracker module 128 may monitor or track the various item-level transaction data as they are received into the server platform 120 for a number of purposes related to processing and delivering interactive data. In some examples, the transaction tracker module 128 may analyze transaction item-level data for the purposes of interactive data matching, interactive data generation, interactive data triggering, interactive data activation, and the like.

The product module 132 may map the transaction data received via the purchase history module 126, which may be expressed in a variety of data formats, and map, convert, or transform that data into a more standardized format for use in interactive data generation, triggering, and activation. For example, the received transaction data may be in the form of SKUs (stock-keeping units), UPCs (Universal Product Code), order numbers, item numbers, abbreviated product descriptions, and so forth. Such data may then be mapped to the more standardized format, such as UPCs or other product identifiers.

The interactive data entry/management system 134 may receive parameters regarding one or more interactive data units devised by manufacturers, retailers, and other entities for possible presentation to one or more users. In an example, such parameters may include the type of interactive data (e.g., deliverable to client nodes associated with new customers, deliverable to client nodes associated with customers of competitors, deliverable to client nodes associated with loyal customers, deliverable to client nodes associated with other types of customers, etc.), the products to be purchased and any customer user attributes that can trigger the delivery of the interactive data to a client node of a consumer user, the terms of the reward or incentive resulting from activation of the interactive data, any expiration date or time associated with the interactive data, and so on. The user of the client node 106 may devise such interactive data, modify the interactive data in response to interim results regarding the interactive data, and engage in related activities via the interactive data entry/management system 134.

The campaign tracker module 136 may monitor or track the status or progress of the various interactive data units currently in effect. Such activity may include tracking which interactive data units have been delivered to which client nodes, which client nodes (e.g., associated with consumers) have accepted and/or activated the interactive data units, and the like. In some embodiments, the campaign tracker module 136 may also track statistics regarding the acceptance and activation rates of current interactive data units versus previous interactive data units, as well as generate other metrics allowing a user representing a manufacturer or other entity to compare the relative effectiveness of various interactive data units delivered to selective client nodes, past and present, to adjust the parameters defining current and future interactive data units. More specifically, the campaign tracker module 136 may generate analytical and/or statistical reports showing the status of ongoing promotions; activation rates of interactive data units associated with promotions; consumer user purchase patterns relative to specific products, product categories or other item classes; geographic purchase patterns; price trends; and other consumer-related, retailer-related, or purchase-related statistics. The campaign tracker module 136 may also generate projections about campaign duration and effectiveness, including conversion, engagement, and activation rates and projected times to completion of ongoing promotion campaigns. Such statistics may be sorted and presented according to consumer user attributes, consumer user demographics, consumer user and purchase locations, retailer identity, and other parameters. The campaign tracker 136 may compile and monitor these statistics in real-time, thus allowing the interactive data providers to adjust the outstanding interactive data units to increase activation rate or achieve one or more other goals.

The interactive data matching engine 138 may match interactive data units defined or generated by the various manufacturers, merchants, retailers, or other entities with one or more client nodes based on previous purchases of items by the customer users associated with the client nodes, as set forth by the parameters defining the interactive data units. The interactive data matching engine 138 may also consider other factors in matching interactive data units to client nodes associated with certain consumer users, such as the demographic details of the consumer users, their user preferences, locations where they have purchased previously, and other information associated with the consumer users. In some examples, the interactive data matching engine 138 may also use intermediary data, such as items placed on a list or virtual basket of goods specified by the consumer user for future purchase.

The interactive data delivery engine 140 may deliver the interactive data units matched by the interactive data matching engine 138 to their corresponding client nodes (e.g., client node 102) and consumer users associated with the nodes. The delivery of the interactive data units may occur over one or more computer networks (e.g., network 114). Alternatively or in addition, the interactive data units may be delivered to client nodes or otherwise communicated to consumer users via other methods, such as via e-mail, Short Message Service (SMS), or another messaging service, by displaying a graphical representation of an interactive data unit to a consumer user in a form on a webpage or other graphical user interface, within a mobile computing device application, through an interactive television medium, via a short video or animation, or by other means. In one implementation, such interactive data units may be displayed on a screen of a mobile user device of a client node (e.g., client node 102) for presentation to a retailer at a point of sale. In one example, the interactive data delivery engine 140 may deliver all interactive data units relevant to a list or virtual "basket of goods" specified by the consumer user or the system 100 to the consumer client node 102 of the consumer user. In another implementation, the interactive data delivery engine 140 may provide all such interactive data units relevant to a particular merchant as a group of interactive data units. In yet another example, the interactive data delivery engine 140 may generate a single interactive data unit via the interactive data matching engine 138 that is associated with all individual items in an entire basket of goods, as opposed to generating a single interactive data unit per individual item, to simplify presentation to the retailer for activation of the interactive data unit. Moreover, the interactive data delivery engine 140 may deliver interactive data units associated with a specific retailer to the client node while a mobile client node is located at the retailer. The location of the mobile client node may be determined by way of a Global Positioning System (GPS) circuit operating in the mobile client node, or by the entry of data (e.g., a credit card number) identifying the consumer user associated with the client node at a point of sale system of the retailer.

The modules 122-150 depicted in FIG. 1 represent one particular embodiment of the system 100. In other implementations, some modules may be combined to form fewer modules, some modules may be separated into separate, more numerous modules, some modules may be removed while others are added, and the like. Also, while the data storage 150 is shown in FIG. 1 as a unitary module residing entirely within the server platform 120, the data storage 150 may be provided by one or more systems internal and/or external to the server platform 120 in other embodiments.

Figure 2A:
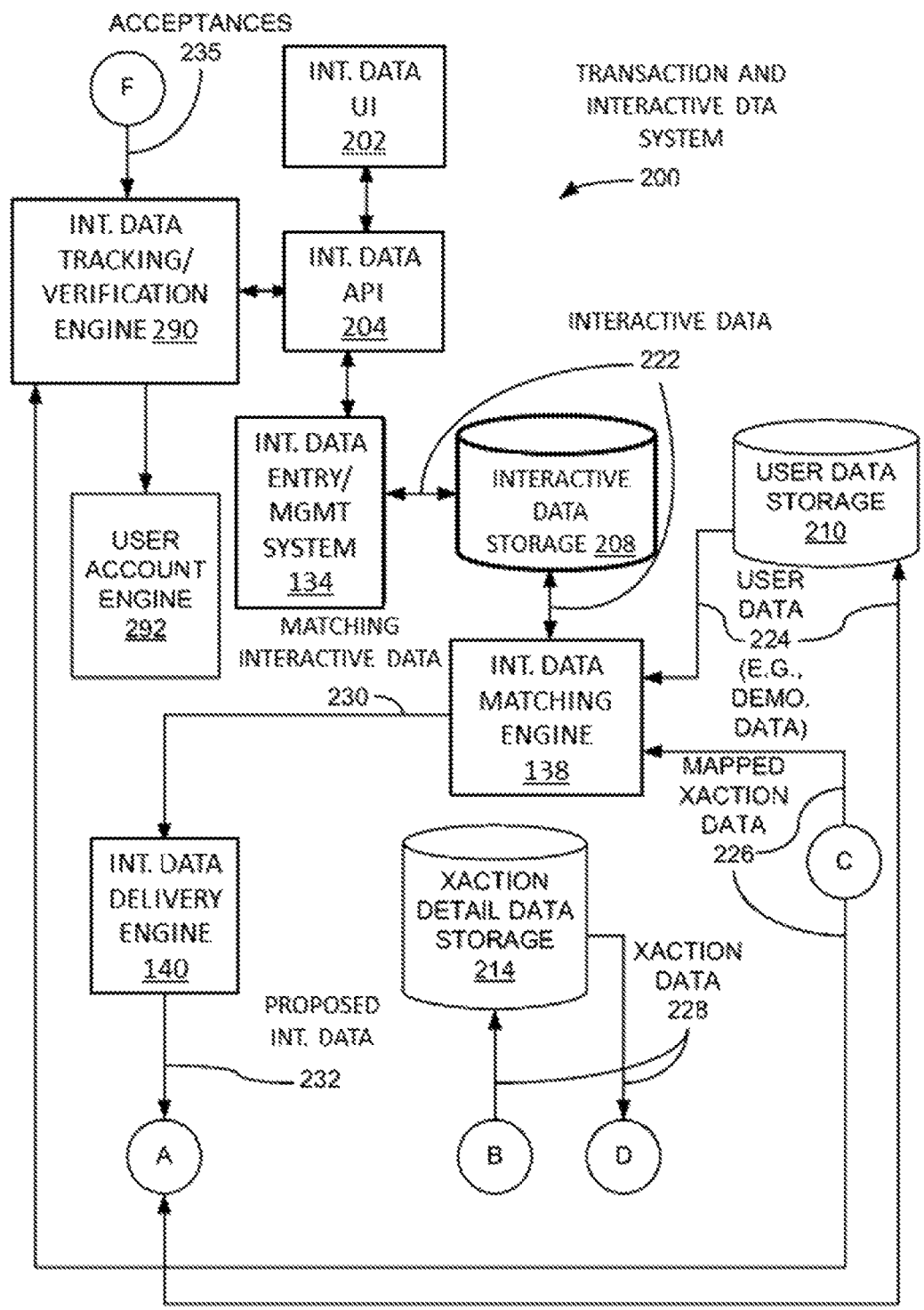
FIGS. 2A, 2B, and 2C present a block diagram of an example transaction and interactive data system including modules and data storage employable in the server platform of FIG. 1.
Figure 2B:
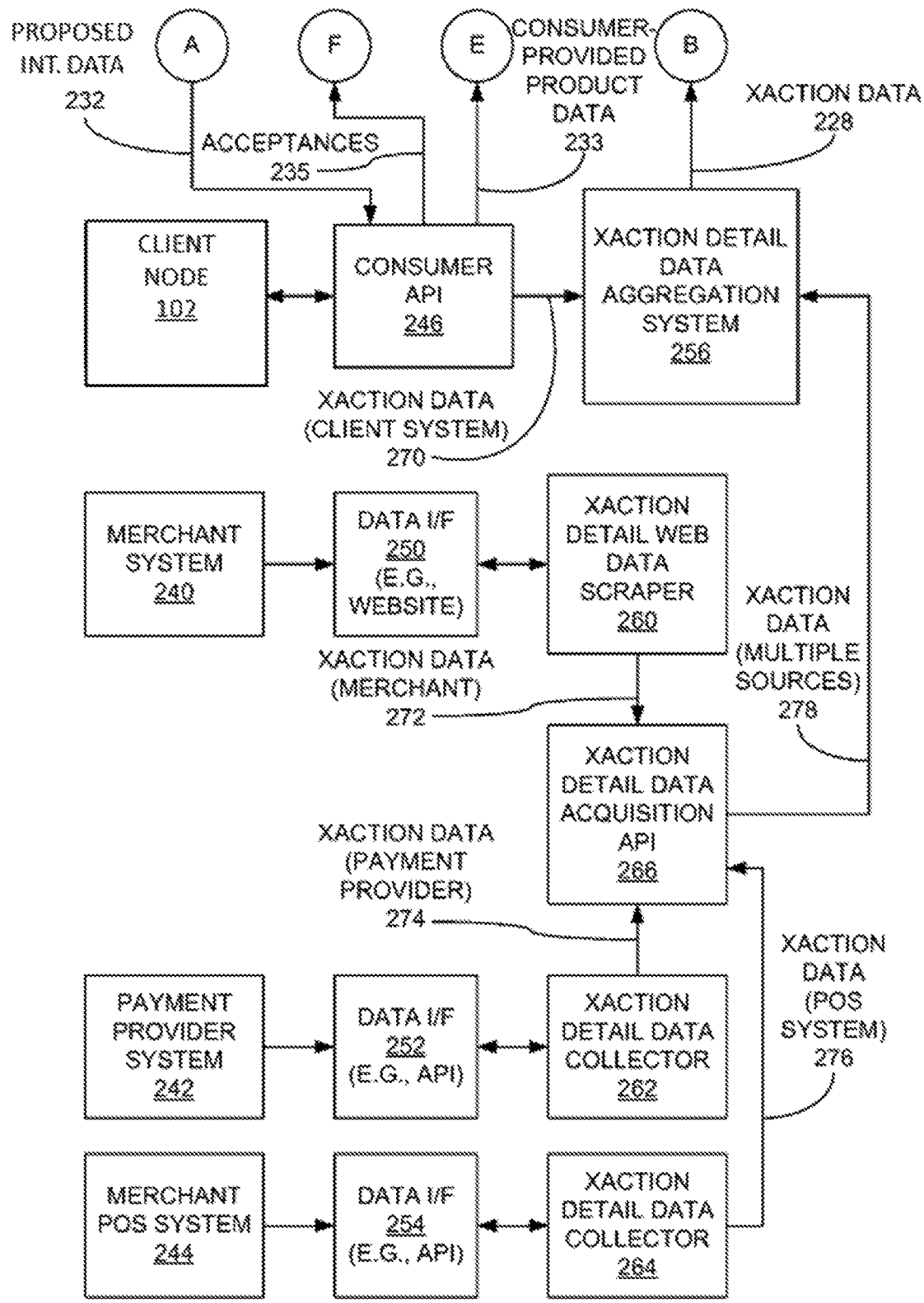
Figure 2C:
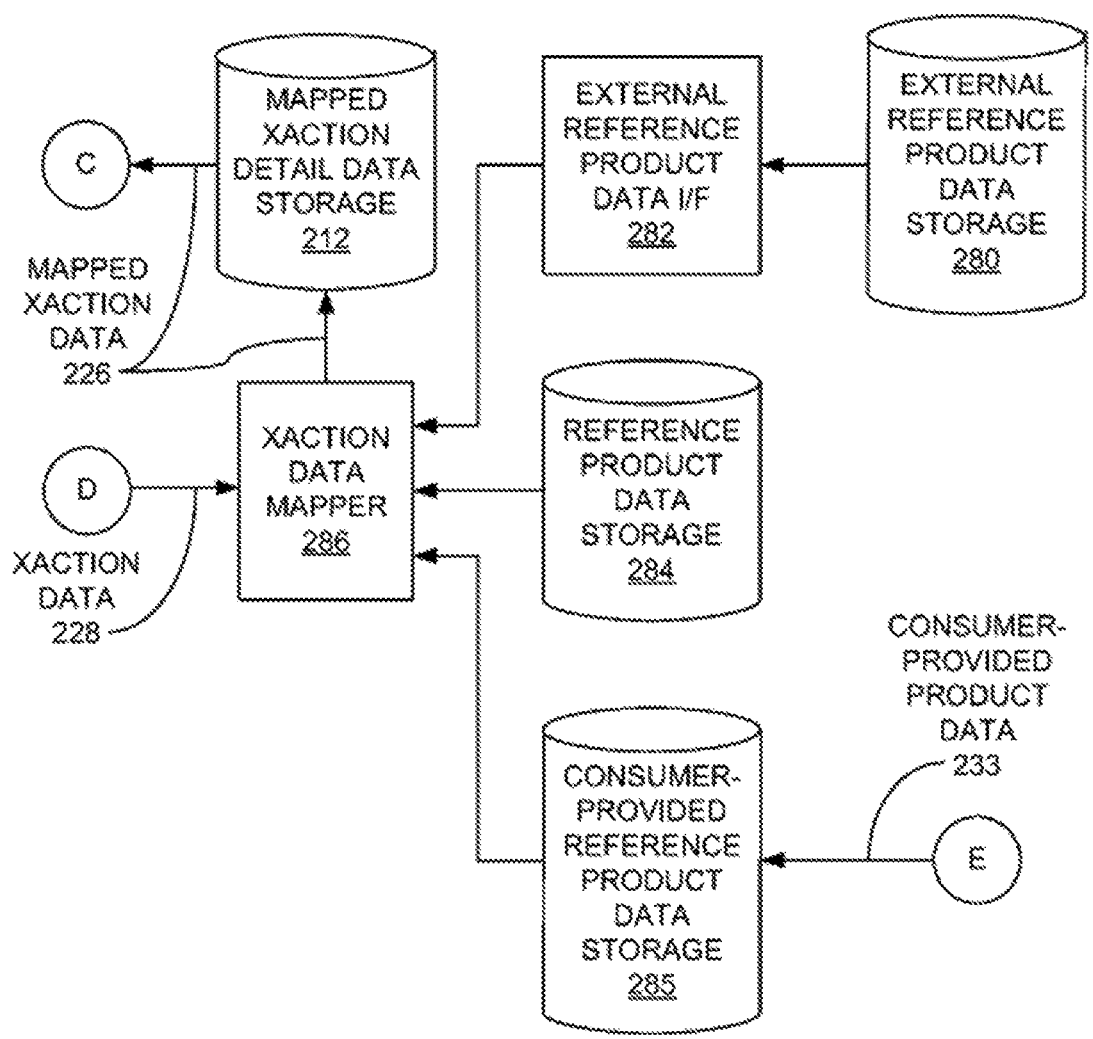

FIGS. 2A, 2B, and 2C present a block diagram of an example transaction and interactive data system 200 including modules and data storage employable in the server platform 120 of FIG. 1. Generally, FIG. 2A describes interactive data matching, tracking, and delivery, FIG. 2B depicts item-level transaction data retrieved from multiple sources, and FIG. 2C illustrates the mapping of the item-level transaction data using more standardized product data. While many modules, as well as the data passed therebetween, are depicted in FIGS. 2A, 2B, and 2C, other modules and associated data flow may not be illustrated therein to simplify FIGS. 2A through 2C and the attendant discussion.

More specifically in FIG. 2A, an interactive data user interface (UI) 202, which may exist as part of the interactive data agent 108 of the client node 106 or as an interface/API module 122 of the server platform 120, allows a representative of a manufacturer, retailer, or other entity providing interactive data to interact with the interactive data entry/management system 134 and an interactive data tracking/verification engine 290 via an interactive data API 204. The interactive data API 204 may be one of the interface/API modules 122. In one example, the interactive data tracking/verification engine 290 may include both the transaction tracker module 128 and the campaign tracker module 136 of FIG. 1.

A user account engine 292 of FIG. 2A, in one embodiment, may receive instructions from the interactive data tracking/verification engine 290 to respond to activations of interactive data to consumer users. For example, the user account engine 292 may make adjustments to the balance or credit of a user's or consumer's account if activation of the one or more interactive data units triggers cash, credit, points, or similar deposit into, or withdrawal from, the consumer user account, such as by way of a direct deposit to a bank account or other account of the consumer user via an automated clearing house (ACH) transfer or a wire transfer, a check delivery via mail, and the like. In some implementations, the system 100 may facilitate consumer users sharing or transferring savings, earnings, credits, or other earned benefits provided by the interactive data units with other consumer users or groups of consumer users via the accounts of the consumer users. Similarly, consumer users may share these benefits with one or more organizations, such as schools, churches, teams, or other designated groups thereof. In another example, the user account engine 292 may provide notifications, code, or some other data to a consumer user via a consumer API 246 (FIG. 2B) and the consumer client node 102 to allow the consumer user to receive a discount, credit, and/or goods as balances of cash or cash-like instruments, and/or apply such balances to a future purchase of one or more items. In yet other implementations, the system 100 may transfer accumulated earnings or balances to non-cash purchase credits deposited onto a retailer loyalty card, an account provided by a retailer, a credit card, a gift card, and so on. Such transfers may be at a one-to-one exchange rate, or at any other exchange rate. The consumer user may then spend these balances on specific products or services, possibly via an electronic commerce platform or portal that treats such balances as cash equivalents. Other forms of benefits in response to activation of an interactive data unit may also be supplied via the user account engine 292 in other examples.

Three possible components of the data storage 150 of FIG. 1 are employed in FIG. 2A: interactive data storage 208, user data storage 210, and transaction detail data storage 214. In one example, the interactive data storage 208 may store interactive data 222 generated by multiple interactive data providers, such as manufacturers, retailers, and other users of the system. More specifically, each interactive data may be defined by one or more interactive data parameters, such as those discussed above (e.g., interactive data type, interactive data product(s), interactive data terms, interactive data expiration dates, applicable customer attributes, and triggering product(s)). This data may be stored or updated by the interactive data UI 202, the interactive data API 204, and the interactive data entry/management system 134.

The user data storage 210 may store user data 224 describing and/or identifying each of a plurality of consumer users or other users. Such information may include, in one example, a customer name and/or identifier, contact information (e.g., address, phone numbers, e-mail addresses, etc.), demographic information (e.g., age, gender, marital status, income level, educational background, number of children in household, etc.), user preferences (such as preferences or reviews regarding favorite products and/or services, favorite shopping outlets, and so on), and previous transaction information (e.g., spending profile of the user, past purchase spending levels on goods sold by various manufacturers or merchants, the frequency of shopping by the user at one or more retail outlets, store loyalty exhibited by the user, how much the user spends in an average transaction, how much the user has spent on a particular basket of goods, how often the user shops in a particular store or kind of store, the estimated profit margin on goods previously purchased, the distances the user has traveled to purchase products in past outings, the amount of fuel expended by the user during an outing, the online or offline stores at which the user has purchased items, the tendency of the user to purchase items on sale, the tendency of the user to purchase items only listed in a basket of goods, and the like).

In additional examples, the user preference information and/or the previous transaction information of the user data storage 210 may include information regarding a consumer's level of engagement with previous interactive data units provided to the consumer user. For example, in addition to storing whether the consumer user accepted and/or activated a particular interactive data unit, the transaction and interactive data system 200 may detect and store information regarding more intermediate forms of engagement with the interactive data by the consumer user, including, but not limited to, whether the consumer user viewed an interactive data unit in an online product gallery, answered a poll about a product associated with the interactive data unit, requested additional information (e.g., in the form of text, audio, video, and so forth) concerning the interactive data unit or product, and shared a particular interactive data unit with another person. This additional information thus permits the transaction and interactive data system 200 to more finely analyze and distinguish the behavior of consumer users, and thus to target interactive data units for delivery to the client nodes with more accuracy.

Other or different information related to each of the users may be stored in the user data storage 210 in other examples. In one implementation, a consumer user may provide such information via a client node 102 employed by the consumer user by way of the consumer API 246. In some examples, such data may also be acquired via the Internet, by third-party organizations holding such information, and other means.

The transaction detail data storage 214 stores item-level transaction data 228 from the transaction detail data aggregation system 256 (FIG. 2B), described in greater detail below. In one example, the item-level transaction data 228 may include data describing transactions for products or services from a plurality of users or consumers in a number of different formats prior to that data being mapped or translated into a more standardized format. As discussed more fully below, a transaction data mapper 286 (FIG. 2C) may access the item-level transaction data 228 to perform the mapping function.

The other modules presented in FIG. 2A (e.g., the interactive data entry/management system 134, the interactive data matching engine 138, and the interactive data delivery engine 140) operate as described above in connection with FIG. 1.

FIG. 2B depicts how the item-level transaction data 228 may be retrieved from any of multiple sources and aggregated for storage in the transaction detail data storage 214. As shown, the item-level transaction data 228 may be received from one or more consumer client nodes 102, web-accessible merchant nodes 240, payment provider nodes 242, and merchant point-of-sale (POS) nodes 244. Other potential entities, such as other individuals or corporations, may serve as sources of the item-level transaction data in other implementations.

In the case of the consumer client node 102, the transaction data initially may be in the form of paper forms provided by one or more retailers that list individual items or services purchased by the consumer user. In one example, the consumer user operating the consumer client node 102 may scan and/or photograph a paper form, the resulting image of which is then processed to generate data identifying the various items purchased. This processing of paper forms is discussed in greater detail hereinafter with respect to FIGS. 6, 7A, and 7B.

In other examples, the consumer client node 102 may receive an electronic form or similar data from a retailer. Such information may be received as information displayed on a webpage to the consumer user, as text provided in an e-mail message, SMS message, or other communication and/or electronic record transmitted to the consumer user, as data received from an "electronic wallet" or other mobile payment system, or via other means. In one example, the consumer client node 102 may receive electronic purchase information, including item-level transaction detail data, at a point-of-sale via short-range wireless communication, such as near field communication (NFC). This information may then be supplemented by data indicating the location of the consumer client node 102, and hence the retailer at which the purchase takes place. This location data may be generated via GPS circuitry in a mobile device of the consumer user, or may be received from a point-of-sale system of the retailer. The electronic form may then be processed by way of parsing the received information to extract the item-level transaction data of interest.

For purchases made via a website, a browser application executing on the consumer client node 102 may include a "plug-in" that captures and records purchases made by the consumer user via the consumer client node 102. In another example, software may be executed on the consumer client node 102 to identify, collect, and transmit form information and data stored on the consumer client node 102 for processing by the transaction and interactive data system 200. In yet another implementation, software may be executed on the consumer client node 102 to identify various external sources of form data and transmit information about the sources to the transaction and interactive data system 200 for further processing. The consumer client node 102 may also identify external sources of form data, collect the form information from those sources, and transmit the collected information to the transaction and interactive data system 200 for further processing. In yet other examples, the consumer client node 102 may receive item-level transaction data via manual entry by the consumer user through a web interface, mobile application, or other mechanism providing a user interface for such a purpose.

In some implementations, the consumer user may specify one of multiple consumer user accounts in the system 100 to allow a consumer user to attribute a purchase to a particular account (e.g., a personal account or a business account), or to attribute a purchase to an account of another consumer user, such as a family member.

The form information and/or item-level transaction data received or generated at the consumer client node 102 may then be provided to the transaction detail data aggregation system 256 as client device transaction data 270 by way of the consumer API 246 provided at the server platform 120. The consumer client node 102 may provide the transaction data immediately, such as at the point of sale or time of transaction, or at some later time, such as when the consumer client node 102 is synchronized with a larger computer system or is within range of a wireless communication network.

Another source of item-level transaction data may be the merchant node 240. In some implementations, the merchant node 240 may provide item-level transaction data for multiple consumer users that have purchased products or services from the merchant who operates the merchant node 240. In one example, a consumer user may explicitly authorize the merchant node 240 to provide the transaction data pertaining to the customer user. In some implementations, the merchant node 240 may post the item-level transaction data to a data interface 250, such as a secure website or other network portal, upon completion of each consumer transaction or at periodic or predefined intervals. A transaction detail web data scraper 260 may then retrieve the posted transaction data periodically from the website or portal and provide the retrieved transaction data as merchant transaction data 272 to the transaction detail data aggregation system 256 via a transaction detail data acquisition API 266.

Similarly, the payment provider node 242, such as a third-party entity for facilitating payment transfers between the consumer user and the merchant, may provide item-level transaction data pertaining to transactions between multiple consumer users and merchants to a second data interface 252, such as an API or a secure website. Depending on the embodiment, the payment provider node 242 may provide the data for a particular transaction upon completion of that transaction, or may collect data for multiple transactions and transfer the data in batches periodically or according to some schedule. A first transaction data collector 262 may retrieve the posted transaction data from the second data interface 252 and deliver the transaction data as payment provider transaction data 274 to the transaction detail data acquisition API 266, which then transfers the data to the transaction detail data aggregation system 256 as transaction data 278.

As mentioned above, the merchant POS node 244 may be another source of item-level transaction data. Examples of the merchant POS node 244 may include computing systems located at physical retail locations responsible for generating item-level transaction data at the associated location. The merchant POS node 244 may provide item-level transaction data pertaining to transactions between multiple consumer users and the merchant to a third data interface 254, such as an API. In one example, the data from the merchant POS node 244 may be transferred to the third data interface 254 via a back-end system (not depicted in FIG. 2B), which may serve multiple retail locations of the merchant. In some implementations, the merchant POS node 244 or the back-end system may determine which consumer users have consented to have their transaction data relayed to the third data interface 254 prior to transferring that data. The merchant POS node 244 may identify the consumer user for this purpose by way of personal or contact information of the consumer user provided by the consumer user during the transaction, the number of the credit card employed by the consumer user to pay for the transaction, a loyalty member number of the customer user, or a consumer user-specific barcode or quick response (QR) code. In other examples, the consumer user may consent to allow the transfer of the item-level transaction data to occur for all transactions, only for certain transactions specifically designated by the user, or only for transactions involving certain merchants.

Similar to the payment provider node 242, the merchant POS node 244 may provide the data for each transaction upon completion of the transaction, or may collect data for multiple transactions and transfer the data periodically or according to a predetermined schedule. A second transaction data collector 264 may then retrieve the posted transaction data from the third data interface 254 and deliver the transaction data as POS system transaction data 276 to the transaction detail data acquisition API 266, which then transfers that data to the transaction detail data aggregation system 256 as transaction data 278.

In some implementations, the various nodes 240, 242, 244 may push the data to the transaction detail data acquisition API 266 without the assistance of the transaction detail web data scraper 260 and the transaction detail data collectors 262, 264. Further, any or all of the transaction data depicted in FIGS. 2A and 2B may be encrypted prior to transmission to promote security of the data.

In response to receiving the client device transaction data 270 and the transaction data 278 from the remaining sources, the transaction detail data aggregation system 256 may aggregate and otherwise process the data and store the resulting transaction data 228 at the transaction detail data storage 214 (FIG. 2A). In some implementations, the transaction detail data aggregation system 256 may filter out duplicate item-level transaction data that is retrieved or received from multiple sources to ensure that a particular purchased product or service is not represented more than once in the aggregated transaction data 228. For example, the consumer client node 102 may transmit transaction data provided on a physical form (e.g., paper form) to the transaction detail data aggregation system 256, while the merchant POS node 244 associated with that same transaction may provide the same or similar data.

In FIG. 2C, a transaction data mapper 286 may receive or retrieve the transaction data 228 from the transaction detail data storage 214 and map that data to more standardized product data retrieved from one or more sources. In one example, each item represented in the product data may be identified by a UPC or other standardized or unique identifier, possibly supplemented by a description of the product or other information. As illustrated in FIG. 2C, one possible source of product data is the reference product data storage 284 provided by the server platform 120. In one example, the reference product data storage 284 may include item-level product data previously received at the server platform 120 from other external product databases (e.g., various databases by Gladson®, or Kwikee® by MultiAd®, Inc.) or public repositories, or provided directly or indirectly by consumers, manufacturers, or retailers.

The transaction data mapper 286 may also receive product data in the form of consumer-provided product data 233 received from one or more consumer client nodes 102 via the consumer API 246 (FIG. 2B) discussed above and stored in a consumer-provided reference product data storage 285 (FIG. 2C). One or more consumer users may provide such data by entering the UPC and other identifying information for the product manually through a user interface of the consumer client node 102, by scanning the UPC and manually entering a description of the product, by photographing the packaging of the product (including the UPC), by uploading or otherwise transmitting images of a physical form containing item-level data, or by other means. "Crowdsourcing" of such information from many consumer users may increase the number of products for which detailed product information may be provided to the transaction and interactive data system 200. In addition, information for any particular product may be provided by multiple consumer users, thus allowing the transaction and interactive data system 200 to process multiple types of information about the same product to produce more complete, detailed data regarding that product compared to what may be provided by a single consumer user.

In an example, the transaction data mapper 286 may also retrieve product data from an external reference product data storage 280 located external to the server platform 120 via an external reference product data interface 282. The retrieved product data may include, for example, a UPC for each product or item of interest and images for each product, as well as other identifying data. The external reference product data interface 282 may access the external product data storage 280 via a secure website, via an API, or the like.

Accordingly, the transaction data mapper 286 may receive product data from one or more consumer client nodes 102, the external reference product data storage 280, and/or the internal reference product data storage 284. The transaction data mapper 286 may aggregate, and possibly further process, the retrieved product data before mapping the transaction data 228 received from the transaction detail data storage 214 to the received product data and storing the resulting mapped transaction data 226 in a mapped transaction detail data storage 212. In one example, the transaction data mapper 286 may filter out duplicate product data entries identifying the same product and may combine and/or prioritize multiple product data entries to produce the most accurate and detailed data for a product, in addition to other possible data processing functions. In one example, the transaction data mapper 286 may map transaction data 228 for a particular purchased item by updating that data to include a UPC, product image, or other unified or standardized data for that item, as provided by the product data received at the transaction data mapper 286.

Given the contents of the interactive data storage 208, the user data storage 210, and the mapped transaction detail data storage 212, the transaction and interactive data system 200 may generate interactive data units that are targeted to individual customer users or identifiable groups thereof, present those interactive data units to the client nodes associated with the consumer users, monitor and reward activations of the interactive data units by the consumer users, modify interactive data units based on the activation rates of the interactive data units and other factors, and so forth. In one embodiment, the transaction and interactive data system 200 may record and analyze a given consumer user's purchasing habits and behavior, including that consumer user's behavior relative to previous interactive data units. These habits and behavior may then be memorialized in the user data storage 210 along with other consumer user traits and characteristics, which may then be used by the transaction and interactive data system 200 as criteria for future interactive data units. Thus, the elasticity of demand of a consumer user for a particular product or brand may be measured, stored, and then employed in future interactive data presentations, thus allowing manufacturer and merchant agents to personalize interactive data and, therefore, pricing of products for that particular consumer user.

Returning to FIG. 2A, in operation, a manufacturer, retailer, or other commercial entity may communicate with the interactive data entry/management system 134 via the interactive data client node 106 and the interactive data agent 108, in communication with the interactive data UI 202 and interactive data API 204, to specify and/or modify interactive data units for presentation to one or more consumer users. The resulting interactive data 222 are stored in the interactive data storage 208. The interactive data matching engine 138 may then access portions of the interactive data 222 from the interactive data storage 208, user data 224 from the user data storage 210, and the mapped transaction data 226 from the mapped transaction detail data storage 212 to match current interactive data with one or more consumer users represented in the user data storage 210. A description of a particular example of matching interactive data units with consumer users is described below in connection with FIGS. 3A, 3B, and 3C.

Those interactive data units that are matched with one or more consumer users are represented in matching interactive data 230 that the interactive data matching engine 138 may deliver to the interactive data delivery engine 140. In turn, the interactive data delivery engine 140 communicates the proposed interactive data 232 to the targeted consumer users by way of an e-mail message, an SMS message, a mobile application notification, a web page, a web application notification, and/or other means of delivery by way of the consumer API 246 to the consumer client nodes 102 of interest. Further, in some examples, the interactive data delivery engine 140 may receive acceptances of the proposed interactive data units from consumer users. In these cases, a consumer user may be required to accept an interactive data unit 232 before performing in whatever manner may be necessary to activate or engage with the interactive data unit 232.

The interactive data tracking/verification engine 290 may then determine which interactive data units have been activated by which consumer users by tracking or monitoring the mapped transaction data 226 stored at the mapped transaction detail data storage 212. In one example, if a consumer user that has received an interactive data unit has purchased one or more products required by the interactive data unit, or has performed in some other manner as set forth in the terms of the interactive data unit, the interactive data tracking/verification engine 290 may detect that performance and provide the reward or benefit associated with the interactive data unit. In one example, the interactive data tracking/verification engine 290 communicates with the user account engine 292 to cause the user account engine 292 to provide the reward or benefit, such as by providing a credit (e.g., money, loyalty program points, etc.) to an account of the consumer user. The account may be a bank account, a credit card account, a loyalty program account, or the like.

Figure 3A:
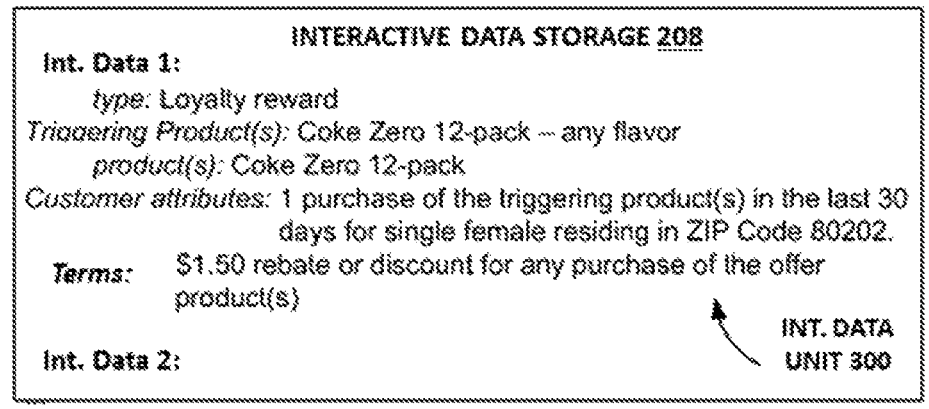
FIGS. 3A, 3B, and 3C provide examples of interactive data, product, and transaction data, respectively, that are stored in the transaction and interactive data system of FIGS. 2A, 2B, and 2C.
Figure 3B:
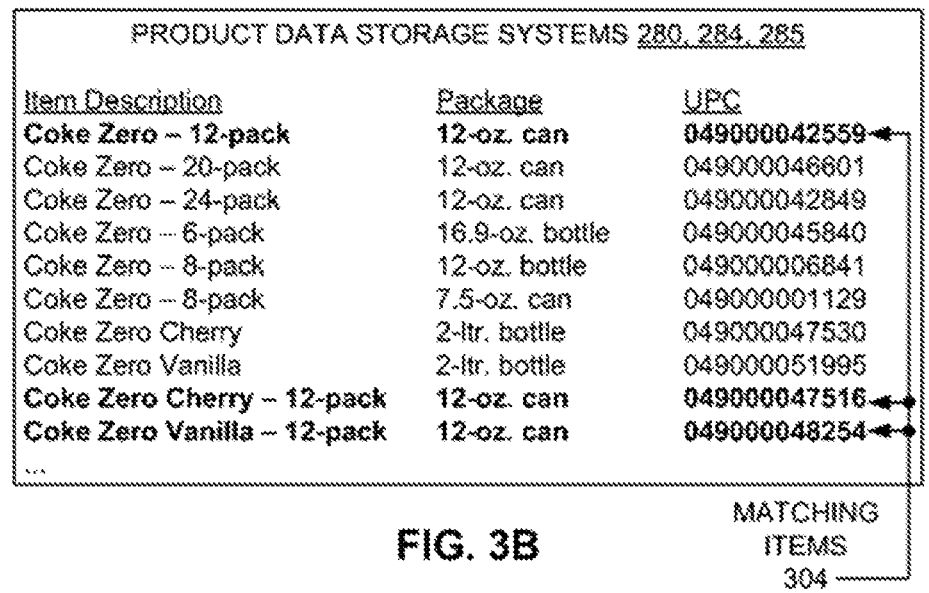
Figure 3C:
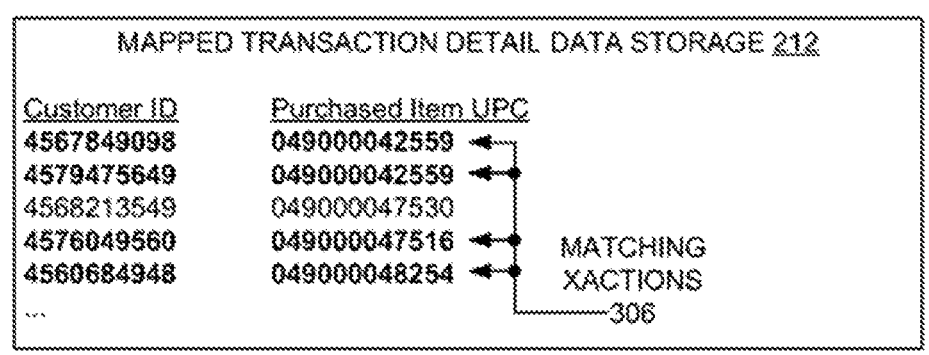

FIGS. 3A, 3B, and 3C provide an example of data stored in the interactive data storage 208, the various reference product data storage systems 280, 284, 285 and the mapped transaction detail data storage 214, respectively. In this example, the interactive data storage 208 includes multiple parameters of each interactive data unit 300 listed therein. As shown in FIG. 3A, the parameters of an interactive data unit 300 may include an interactive data type, an identification of one or more triggering products, one or more activation products, one or more customer user attributes, and interactive data terms. The interactive data type may indicate the type of interactive data or corresponding reward associated with the interactive data, such as a customer loyalty reward, an incentive to become a new customer or to switch away from a competitor, or an incentive associated with a particular level or degree of engagement between the consumer user and the product or brand. The triggering products may be products that, when purchased by a consumer user, cause the associated interactive data unit to be delivered to the consumer user. The activation products may be the products that the consumer user is required to purchase in order to activate the interactive data unit, and thus to receive the reward or benefit of the interactive data unit. The customer user attributes may be those attributes of a consumer user that are to be satisfied to qualify the consumer user to receive the interactive data delivery. Such attributes may include demographic attributes or other attributes of the consumer user, as well as one or more past transactions completed by the consumer user. The interactive data terms may specify the actual benefit or reward to be provided to the consumer user upon activation of the interactive data unit. Other parameters, such as any geographic or other restrictions pertaining to the interactive data unit, eligible retail locations where interactive data units may be activated, initial and expiration dates for activation of the interactive data unit, starting and ending dates for triggering delivery of the interactive data unit, a particular retailer from which the triggering products or activation products are to be purchased, and so on, may be specified for each interactive data unit 300 represented in the interactive data storage 208. In some examples, the total number of deliveries, acceptances, or activations of a particular interactive data unit entered by the interactive data entry/management system 134 may be limited.

In FIG. 3B, the example of the reference product data storage systems 280, 284, 285 depicted therein lists a number of products, each of which is identified by way of an item description, a package description, and a UPC. Greater or fewer types of information may be provided for each item or product listed in the reference product data storage systems 280, 284 in other examples. In this embodiment, each product may be identifiable in the reference product data storage systems 280, 284, 285 with a unique product identifier. In some examples, some products may be denoted as comparable or substitute products of other products in the reference product data storage systems 280, 284, 285. In addition, each product may be denoted by one or more manufacturer-specific or retailer-specific codes identifying the product.

The example mapped transaction detail data storage 212 illustrated in FIG. 3C lists item-level transaction data for multiple customer users that are mapped to standardized product data. As described above, the transaction data mapper 286 generates this data from the reference product data storage systems 280, 284, 285 combined with item-level transaction data received from one or more sources. In the mapped transaction detail data storage 212, each purchased item stored as stored mapped transaction data 226 may be denoted by a UPC of the purchased item and a unique customer identifier. In one implementation, the transaction and interactive data system 200 generates the customer identifier in response to the consumer user registering with the system 200. In other examples, additional information regarding the transaction, such as the date of purchase and the location of purchase, may be included for each transaction item represented in the mapped transaction detail data storage 212. Additionally, the data stored in the mapped transaction detail data storage 212 may be organized according to consumer user, and further according to transaction or shopping outing.

In the specific example described in FIGS. 3A, 3B, and 3C, the transaction data mapper 286 generates the mapped transaction data 226 in the mapped transaction detail data storage 212 using various Coke® Zero item UPCs from the reference product data storage systems 280, 284, 285 to update the transaction data to indicate that, for example, Customer 4567849098 purchased Item 049000042559 (e.g., a 12-pack of 12-oz. cans of Coke® Zero (original flavor)).

Meanwhile, in the interactive data storage 208, the interactive data unit 300 labeled "Interactive Data 1" provides a loyalty reward to a consumer user that has satisfied specific customer user attributes associated with the interactive data unit 300. More specifically, the interactive data 300 indicates that the customer user attributes for receiving the interactive data unit 300 include a single purchase of a triggering product within the last 30 days. In this example, the triggering product is any flavor of a Coke® Zero 12-pack. Thus, if a consumer user has purchased a 12-pack of Coke® Zero in the last 30 days, the transaction and interactive data system 200 may then deliver the corresponding interactive data unit 300 to the client node associated with the consumer user. In this example, the interactive data terms provide for a $1.50 rebate to be paid, or a $1.50 discount to be given, to a single female consumer user residing in ZIP Code 80202 for purchasing the activation product, with the activation product being specified as a Coke® Zero (original flavor) 12-pack.

As a result of the interactive data unit 300 being stored in the interactive data storage 208, the interactive data matching engine 138 may then monitor the mapped transaction detail data storage 212, and possibly the user data storage 210, to identify consumer users who qualify to receive the interactive data unit. In the example illustrated in FIGS. 3A through 3C, the interactive data matching engine 138 may determine that the mapped transaction detail data storage 212 reports several matching transactions 306 involving UPCs that correspond with at least three different matching items 304 that match the triggering product stated in Interactive Data 1. The matching items include a 12-pack of Coke® Zero (UPC 049000042559), a 12-pack of Coke® Zero Cherry (UPC 049000047516), and a 12-pack of Coke® Zero Vanilla (UPC 049000048254), each of which qualifies as a Coke® Zero 12-pack of any flavor. Thus, each of the matching transactions 306 may result in its associated customer users, identified by the customer identifiers of 4567849098, 4579475649, 4576049560, and 4560684948, receiving Interactive Data 1 via the interactive data delivery engine 140.

In a similar fashion, the interactive data tracking/verification engine 290, by way of its connection with the mapped transaction detail data storage 212, may monitor the transactions reported therein to determine if a consumer user that has previously received an interactive data unit has performed according to the one or more interactive data terms of that earlier interactive data unit 300 (e.g., purchases a Coke® Zero (original flavor) 12-pack (UPC 049000042559)). Presuming that the consumer user has successfully performed according to the interactive data terms, the interactive data tracking/verification engine 290 may then communicate with the user account engine 292 to provide the benefit or reward (in this case, the $1.50 rebate or discount) by, for example, crediting an account of the consumer user that amount.

While the examples of FIGS. 3A, 3B, and 3C involve closely related products from a single manufacturer, such as similar types or sizes of a soft drink, the various triggering products, activation products, and other parameters of an interactive data unit 300 need not involve products so closely related, or even related at all. For example, an interactive data unit involving a discount off the price of a loaf of bread may be triggered by a purchase of a gallon of milk, or the purchase of one manufacturer's brand may trigger the presentation of an interactive data unit on a different manufacturer's brand. Consumer users may receive delivers of interactive data units that encourage them to purchase specific combinations of brands or products on a particular shopping outing. They may also receive rewards for purchasing specific brands or products over a pre-specified period of time or in a particular retailer. For example, the transaction and interactive data system 200 may provide a consumer user a specified payment, rebate, or credit in response to the consumer user buying a particular product or range of products a predetermined number of times within a specified time period, such as a month. The transaction and interactive data system 200 may also inform the consumer user of successful interactive data unit activations, as well as progress the consumer user has made toward any interactive data units directed to the consumer user.

The consumer users may also receive interactive data units that reward them for persuading their friends to engage in certain purchase behaviors, with each member of the team or group submitting item-level purchase data in one or more of the manners outlined above, and with the rewards benefitting one or more members of the team or group, or being donated to charitable or other causes on behalf of the team. For example, the transaction and interactive data system 200 may provide a specific team or group of consumer users a predetermined payment, credit, or rebate in response to each of the group members purchasing a specific amount of a particular product or brand of product.

To facilitate group or team interactive data, the transaction and interactive data system 200 may allow a consumer user to invite other consumer users, such as friends and relatives connected to the consumer user via a social network graph or website, to join the first consumer user in a team. The transaction and interactive data system 200 may then monitor the item-level transactions and other activities of the group members to determine progress toward activation of a group interactive data units. The transaction and interactive data system 200 may also inform each team member of their individual and/or team progress toward one or more interactive data units presented to the team. In some examples, a team leader or organizer may also receive commissions in the form of payments, credits, or rebates based on individual or overall team performance toward interactive data activation. Aside from the various individual and team-oriented interactive data units described herein, numerous other examples of interactive data types also exist.

Figure 4:
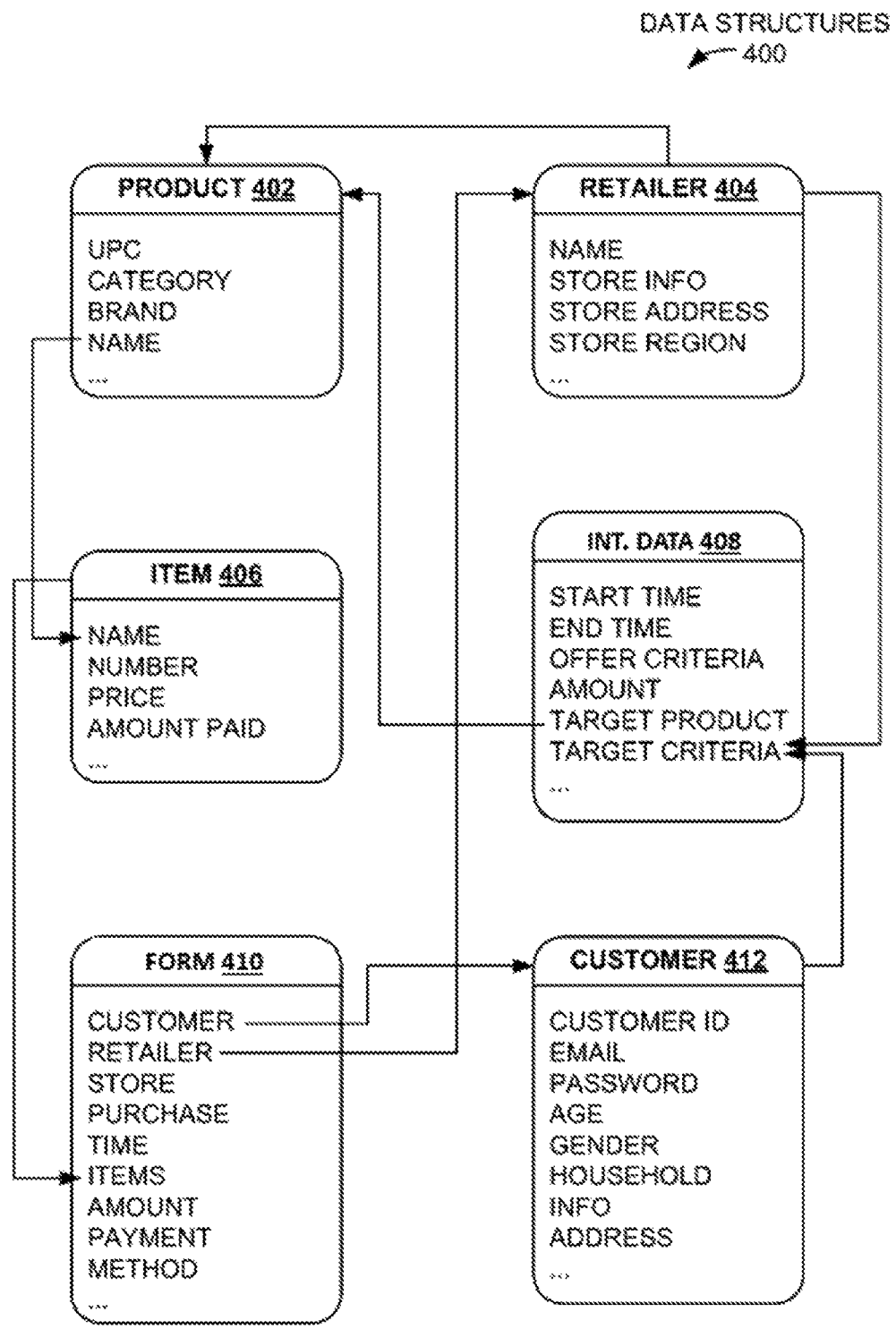
FIG. 4 is a graphical representation of example data structures employable in the transaction and interactive data system of FIGS. 2A, 2B, and 2C.

FIG. 4 is a graphical representation of example data structures 400 employable in the transaction and interactive data system 200 of FIGS. 2A, 2B, and 2C. At a high level, one or more data structures 400 are associated with each entity or item of interest of the transaction and interactive data system 200. As shown in FIG. 4, the data structures 400 may include a product data structure 402 for each product (as stored in the reference product data storage systems 280, 284, 285), a retailer data structure 404 for each retailer or merchant registered with the transaction and interactive data system 200, an item data structure 406 identifying each purchased item (as stored in the transaction detail data storage 214 and/or the mapped transaction detail data storage 212), an interactive data structure 408 for each interactive data unit present in the system 200 (as stored in the interactive data storage 208), a form data structure 410 for each form (whether electronic or paper in origin) associated with a shopping outing, and a customer data structure 412 for each customer user registered with the transaction and interactive data system 200.

Each of the data structures 400 may include data fields for carrying specific types of data associated with the encompassing data structure 400. For example, the product data structure 402 includes data fields for at least a UPC for the product, a product category, a product brand, and a product name. While specific data structure types and data fields are indicated in FIG. 4, other schemes for the data structures 400 and included fields are possible in other implementations.

Also depicted in FIG. 4 are links, pointers, or similar structures (as illustrated by the directional arrows provided therein) indicating how the various data structures 400 may be associated with each other. For example, a particular form data structure 410, to identify a customer user and a retailer of the transaction identified in the form data structure 410, may link or point to the specific customer data structure 412 and retailer data structure 404 representing the associated customer user and retailer, respectively. Examples of other links or pointers connecting data structures or data fields therein are presented in FIG. 4. While FIG. 4 generally depicts a relational data structure, a person of ordinary skill in the art will understand that other types of data structures (e.g., NoSQL data stores, such as document store, column-oriented store, key value store, and others) may be used in this and other embodiments in place of, or in combination with, the data structures 400 of FIG. 4. Such data structures may appear with various data store types (e.g., data warehouse, distributed data store, active data store, unstructured data store, and so on).

Figure 5:
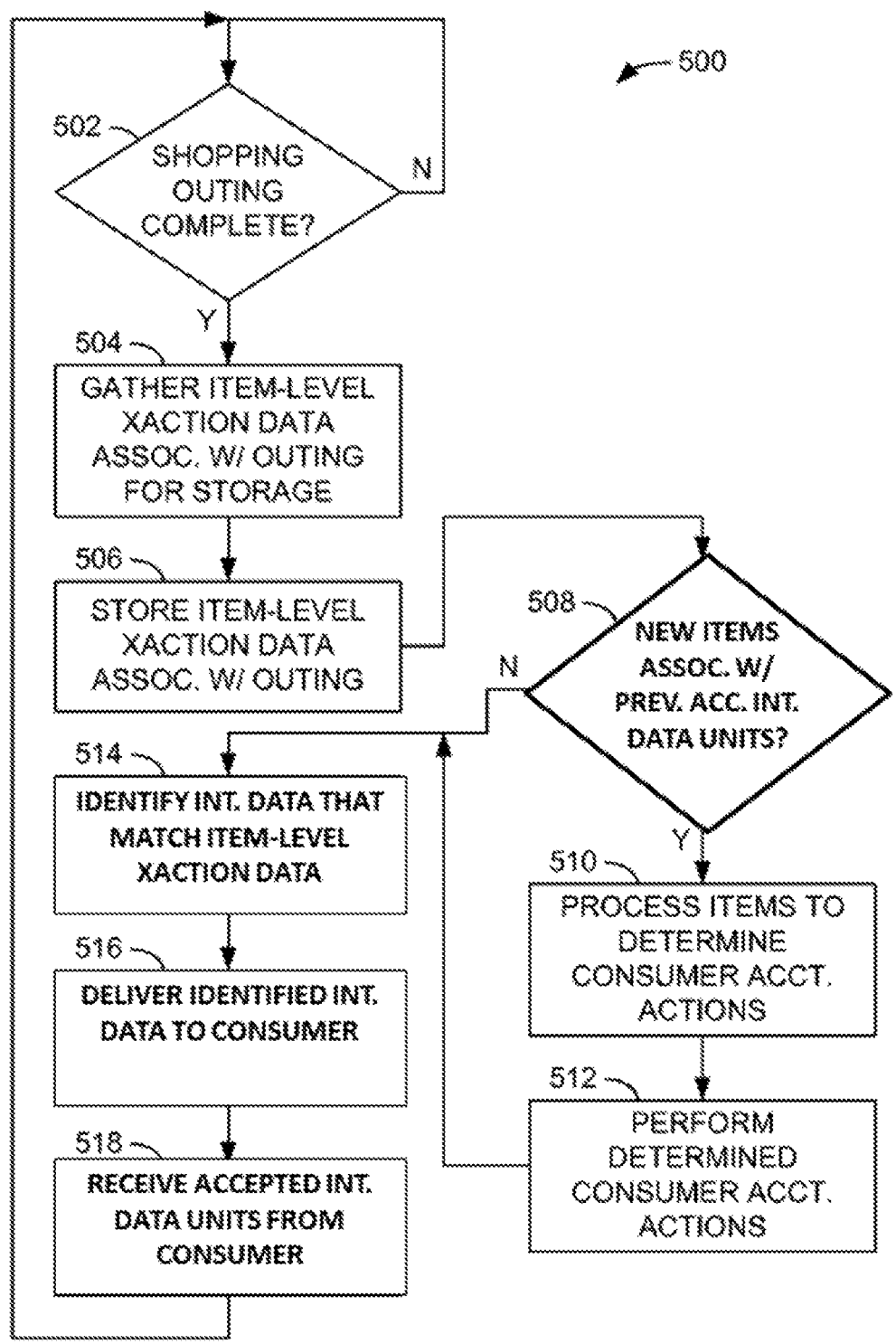
FIG. 5 is a flow diagram illustrating an example method of transaction data gathering and storage, and interactive data matching, generation, tracking, and activation.

FIG. 5 is a flow diagram illustrating an example method 500 of transaction data gathering and storage, and interactive data matching, generation, tracking, and activation, as described above. In the method 500, for each shopping outing that is completed by a consumer user (operation 502), the item-level transaction data associated with the outing may be gathered for storage (operation 504). As described above, this data may be received from multiple sources, such as the consumer client node 102, the merchant system 240, the payment provider system 242, and/or the merchant POS system 244. The transaction data may then be stored in the transaction detail data storage 214 as transaction data 228 (operation 506). Further, the transaction data mapper 286 may map the stored transaction data 228 to more standardized or mapped transaction data 226 in the mapped transaction detail data storage 212.

The interactive data tracking/verification engine 290 may then determine whether the newly purchased items are associated with any previous interactive data units accepted by the consumer user (operation 508). In one example, the transaction and interactive data system 200 may expect a consumer user to explicitly accept an interactive data unit (such as by way of a user interface facilitated by the consumer agent 104 executing on the consumer client node 102) that the consumer user previously received from the system 200 prior to activating the interactive data unit. In other implementations, an explicit acceptance of an interactive data unit may not be necessary, as performing the necessary actions to activate the interactive data unit may constitute an implicit acceptance of the interactive data unit.

If the newly purchased items are associated with a previously accepted interactive data unit (operation 508), the interactive data tracking/verification engine 290 may then process the data identifying the items purchased, and possibly other data related to the purchase, to determine the reward or benefit to be provided to the consumer user (operation 510), as discussed earlier. For example, the identity of the retailer or information describing the consumer user's attributes may also be considered in determining the consumer's eligibility for the benefit, as described in the interactive data terms of the interactive data unit. The interactive data tracking/verification engine 290 may then employ the user account engine 292 to provide the benefit to the consumer user (operation 512), such as by way of crediting an account of the consumer user.

After the providing of the benefit (operation 512), or if the newly purchased items do not correspond with previously accepted interactive data units (operation 508), the interactive data matching engine 138 may then identify interactive data units that match with, or are triggered by, the newly purchased items (operation 514), as described above. Any interactive data units triggered by the new purchases made by the consumer user may then be delivered to the consumer user via the interactive data delivery engine (operation 516). After delivery of such an interactive data unit, the consumer user may accept the interactive data unit (operation 518), either explicitly or implicitly, to render the interactive data unit activateable.

As shown in FIG. 5, the various operations of the method 500 are performed each time item-level transaction data for a shopping outing, such as at a physical store or online outlet, are received at the transaction and interactive data system 200. However, the timing of the operations of the method 500 may be different in other embodiments. For example, the set of operations shown in FIG. 5 may be performed in a continual or repetitive manner regardless of the timing of the reception of the item-level transaction data into the system 200.

Figure 6:
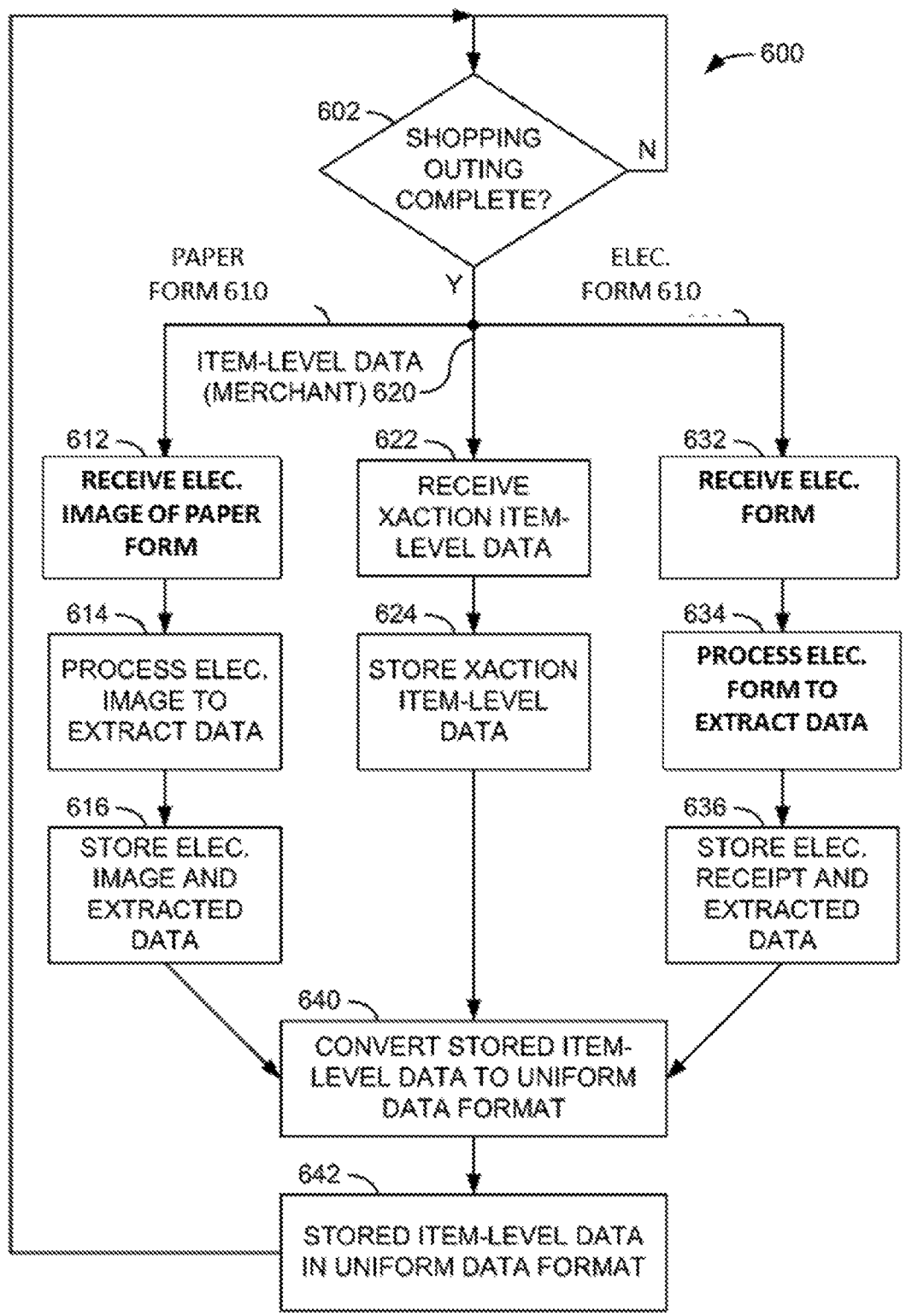
FIG. 6 is a flow diagram illustrating an example method of transaction data retrieval and processing.

FIG. 6 is a flow diagram illustrating an example method 600 of transaction data retrieval and processing, as is described above. Once a shopping outing has been completed (operation 602), item-level transaction data may be provided to the transaction and interactive data system 200 in a number of forms. As shown in FIG. 6, these forms include, for example, a paper form 610, merchant item-level transaction data 620, and an electronic form 630 provided by a payment provider system. However, other forms of item-level transaction data may be provided in other examples.

If the transaction data is presented in the form of a paper form 610, the consumer client node 102, in conjunction with the transaction detail data aggregation system 256, may capture or receive an electronic image of the paper form 610 (operation 612), process the electronic image to extract the item-level transaction data represented in the image (operation 614), and store the electronic image and the extracted data (operation 616) as transaction data 228 in the transaction detail data storage 214 via the transaction detail data aggregation system 256. In this example, the electronic image may be stored to so that a human comparison of the electronic image and the extracted data may be monitored for accuracy, and so that processing of the image may be attempted again to more accurately extract the transaction data. In other implementations, only the extracted data may be stored. More detailed examples of the imaging of the paper form and the processing of the resulting electronic images are provided below in conjunction with FIGS. 7A and 7B.

If the item-level transaction data is provided in the form of merchant item-level data 620, such as by way of a merchant system 240 website (e.g., via data interface 250) or via a merchant POS system 244 (e.g., via data interface 254), the transaction detail web data scraper 260 or the transaction detail data collector 264 may receive the transaction item-level data (operation 622) and forward the data via the transaction detail data acquisition API 266 to the transaction detail data aggregation system 256 for storage (operation 624) as transaction data 228 in the transaction detail data storage 214. In some examples, the transaction data may be processed to arrange the data in a format understood by the transaction detail data aggregation system 256.

If the transaction data is provided as an electronic form 630, such as what may be transmitted from a payment provider system 242, the transaction detail data collector 262 may receive the electronic form (operation 632), process the electronic form to extract the transaction data (operation 634), and store the electronic form and the extracted data (operation 636) as transaction data 228 in the transaction detail data storage 214 by way of the transaction detail data collector 262, the transaction detail data acquisition API 266, and the transaction detail data aggregation system 256. Similar to the paper form 610 example, the extraction process may introduce errors into the transaction, and storing the electronic form 630 may aid in comparing the extracted data with the original form and in generating new extracted data. In one example, the electronic form 630 may include image data that is processed to extract the item-level transaction data.

The transaction data mapper 286 may map or convert the transaction data 228 stored in the transaction detail data storage 214 to a uniform data format (operation 640) by using reference product data provided by one or more consumer client nodes 102 or reference product data storage systems 280, 284, 285 as explicated above. The resulting mapped transaction data 226 may then be stored in the mapped transaction detail data storage 212 (operation 642), where the interactive data matching engine 138 may access the mapped transaction data 226 for interactive data matching and activation purposes.

Figure 7A:
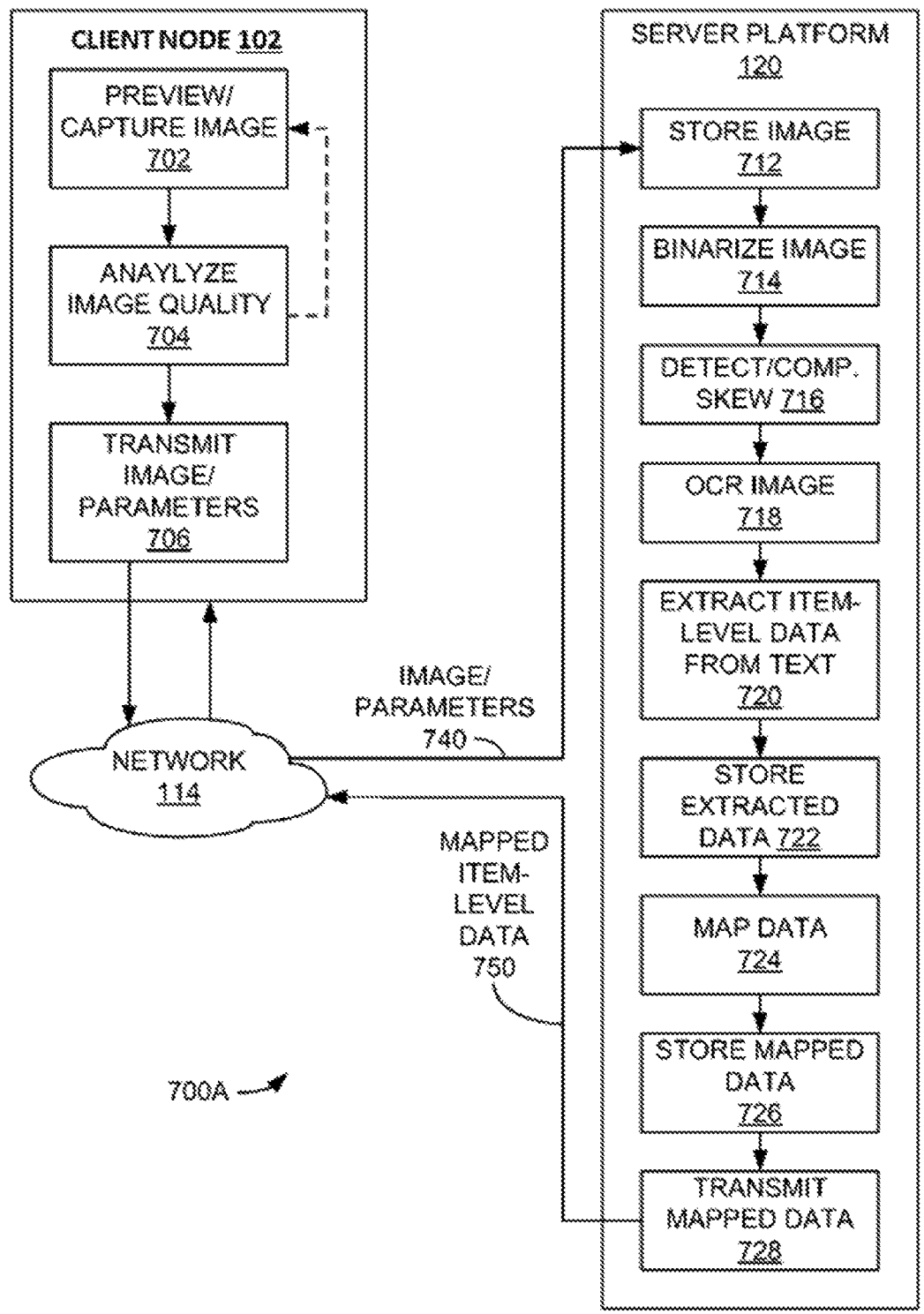
FIG. 7A is a flow diagram of an example method of capturing and processing an image of a paper form, and processing and storing the resulting transaction data, in which processing of the image occurs primarily in the server platform of FIG. 1.
Figure 7B:
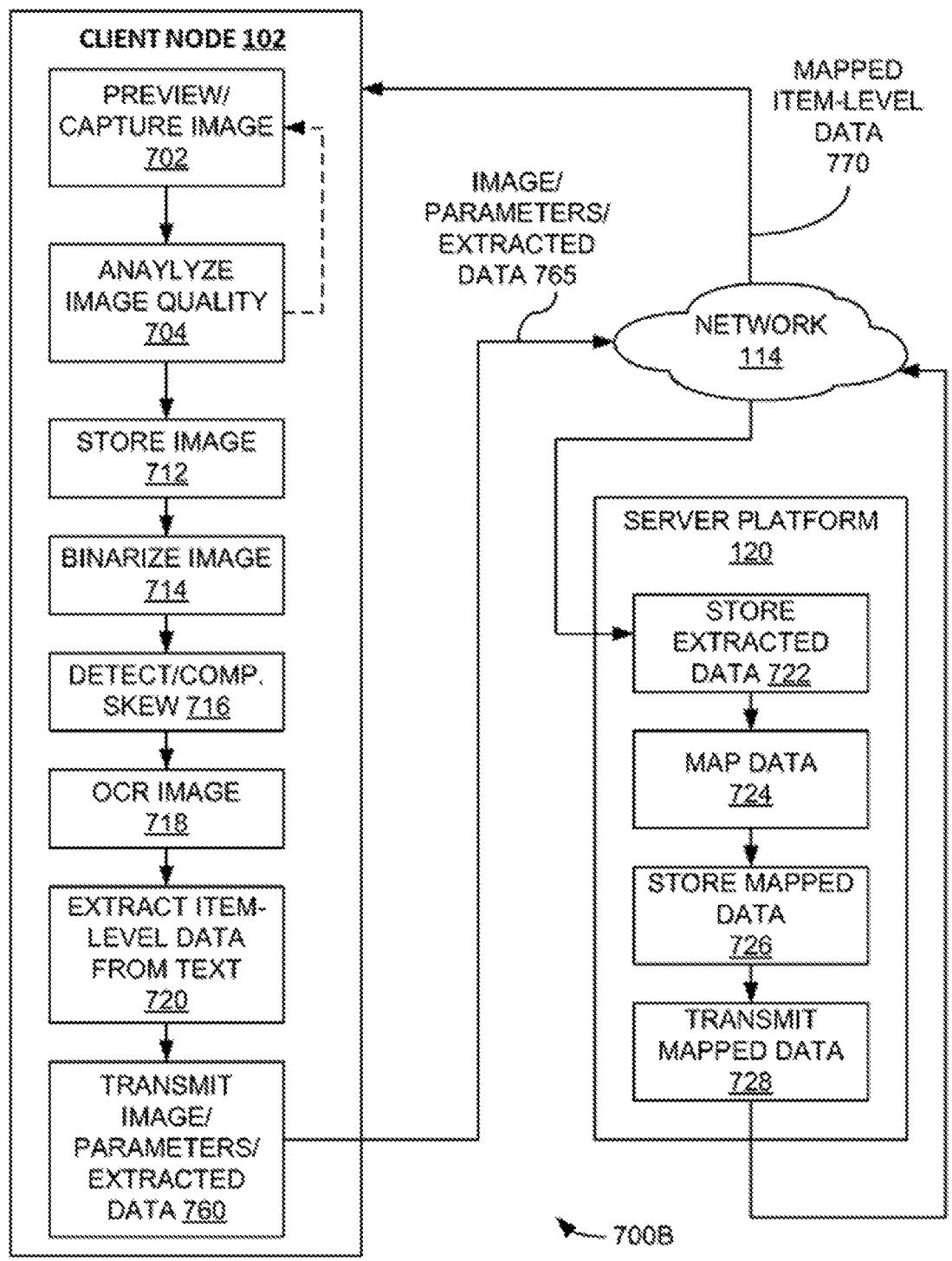
FIG. 7B is a flow diagram of an example method of capturing and processing an image of a paper form, and processing and storing the resulting transaction data, in which processing of the image occurs primarily in the consumer client node of FIG. 1.

FIGS. 7A and 7B are flow diagrams of example methods 700A, 700B of capturing and processing an image of a paper form 610, and processing and storing the resulting transaction data. More specifically, FIG. 7A depicts the method 700A, in which the processing of the image data occurs primarily in the transaction and interactive data system 200, while FIG. 7B illustrates the method 700B, in which the processing of the image data occurs primarily in the consumer client node 102 that captured the image. In the particular method 700A of FIG. 7A, an electronic image of the paper form 610 is captured or previewed (operation 702).

After capture of the image (operation 702), the consumer client node 102 may analyze one or more aspects of the quality of the image (operation 704). In some implementations, the consumer client node 102 may identify problems with the image that may be corrected by a second image capture operation. Such conditions may include, but are not limited to, inadequate lighting, lack of focus or sharpness, improper alignment of the camera or other imaging device provided by the consumer client node 102, and image distortion. Further, the analysis of the image may be enhanced using data provided by orientation sensors or other components of the consumer client node 102.

Based on the analysis of the image (operation 704), the consumer client node 102 may determine that another image of the paper form 610 should be captured (operation 702), in which case the consumer client node 102 may provide guidance to the consumer user via a user interface of the consumer client node 102 regarding additional lighting, camera orientation relative to the paper form 610, and so on. If, instead, the consumer client node 102 determines that the previously captured image is of acceptable quality, the consumer client node 102 may then transmit the image (operation 706), possibly along with one or more parameters describing the image and/or camera settings employed to capture the image, as image 740 via the communication network 114 to server platform 120 hosting the transaction and interactive data system 200.

After being received at the server platform 120 via the consumer API 246, the transaction and interactive data system 200 may store the image 740 (operation 712). In one example, the consumer API 246 may store the image and perform various other operations discussed below. The transaction and interactive data system 200 may then binarize the image (operation 714). More specifically, if the image 740 is a color or grayscale image, the transaction and interactive data system 200 may then convert the image 740 into a binary image, in which each pixel may be, for example, black or white. Two examples of an algorithm useful for binarizing an image is the Local Adaptive Niblack Algorithm and Sauvola's Algorithm, which is a modification of the Niblack approach useful for images with uneven lighting or a lightly textured background. However, other methods or algorithms for binarizing an image may also be employed in other embodiments in order to prepare the image for subsequent processing.

After the image is binarized (operation 714), significant skew or misalignment of the image relative to edges or borders of the image may be detected and compensated (operation 716) to ensure the image is properly aligned for subsequent processing. In one example, the transaction and interactive data system 200 may identify text lines and/or baselines in the image, and then rotate the image, if necessary, based on those lines.

After any skew detection and/or compensation is performed (operation 716), the transaction and interactive data system 200 may then perform optical character recognition (OCR) on the binarized and/or de-skewed image (operation 718). In this operation, text or characters represented in the image may be extracted based on one or more OCR algorithms currently available.

The text generated by OCR (operation 718) may then be processed to extract the item-level transaction data represented on the paper form 610 (operation 720). For example, the transaction and interactive data system 200 may parse the generated text or characters, looking for specific types of data, such as UPCs, keywords, and so on, in order to generate the item-level transaction data. Thereafter, the transaction and interactive data system 200, via the transaction data aggregation system 256, may store the item-level transaction data as transaction data 228 in the transaction detail data storage 214.

As discussed above, the transaction data mapper 286 may then map the transaction data 228 from the transaction detail data storage 214 to a unified format (operation 724) using the reference product data storage systems 280, 284, 285. The transaction data mapper 286 may then store the resulting mapped transaction data 226 (operation 726) in the mapped transaction detail data storage 212. In some examples, the transaction and interactive data system 200 may then be transmitted as mapped item-level data 750 via the network 114 to the consumer client node 102 (operation 728), which may then store the mapped item-level data 750.

In FIG. 7B, the method 700B employs most of the same basic operations (e.g., operations 702, 704, 712, 714, 716, 718, 720, 722, 724, 726, and 728) as employed in the method 700A of FIG. 7A to capture, binarize, and/or de-skew the image, extract the item-level transaction data from the image via OCR, and map the resulting data to a unified format. In this method 700B, however, at least the binarization (operation 714), de-skewing (operation 716), OCR (operation 718), and extraction of the item-level transaction data (operation 720) occur in the consumer client node 102 instead of the server platform 120. Only then may the extracted data, possibly in conjunction with the image and parameters related thereto, be transmitted via the network 114 to the server platform 120 (operation 760) as extracted data 765.

In some examples, the decision as to whether method 700A or method 700B is implemented may depend on the processing capabilities and capacities of both the consumer client node 102 and the server platform 120. Further, the server platform 120 may decide whether a particular consumer client node 102 performs one or more of the binarization, de-skew, OCR, and extraction operations (operations 714-720) on a client-by-client basis in view of the individual capabilities of each consumer client node 102 in some embodiments. In some instances in which an OCR result (e.g., the text generated by the OCR operation via operation 718 or the extracted item-level transaction data produced via operation 720) is deemed to be lacking in reliability, a review of the paper form 610 and subsequent manual entry of the associated item-level transaction data and other form data by a human may aid in the capture of information. Further, a human reviewer may be presented with a complete or partial image of the form, as this may aid efficiency of review and data entry, as well as possibly enhance consumer privacy.

Figure 8:
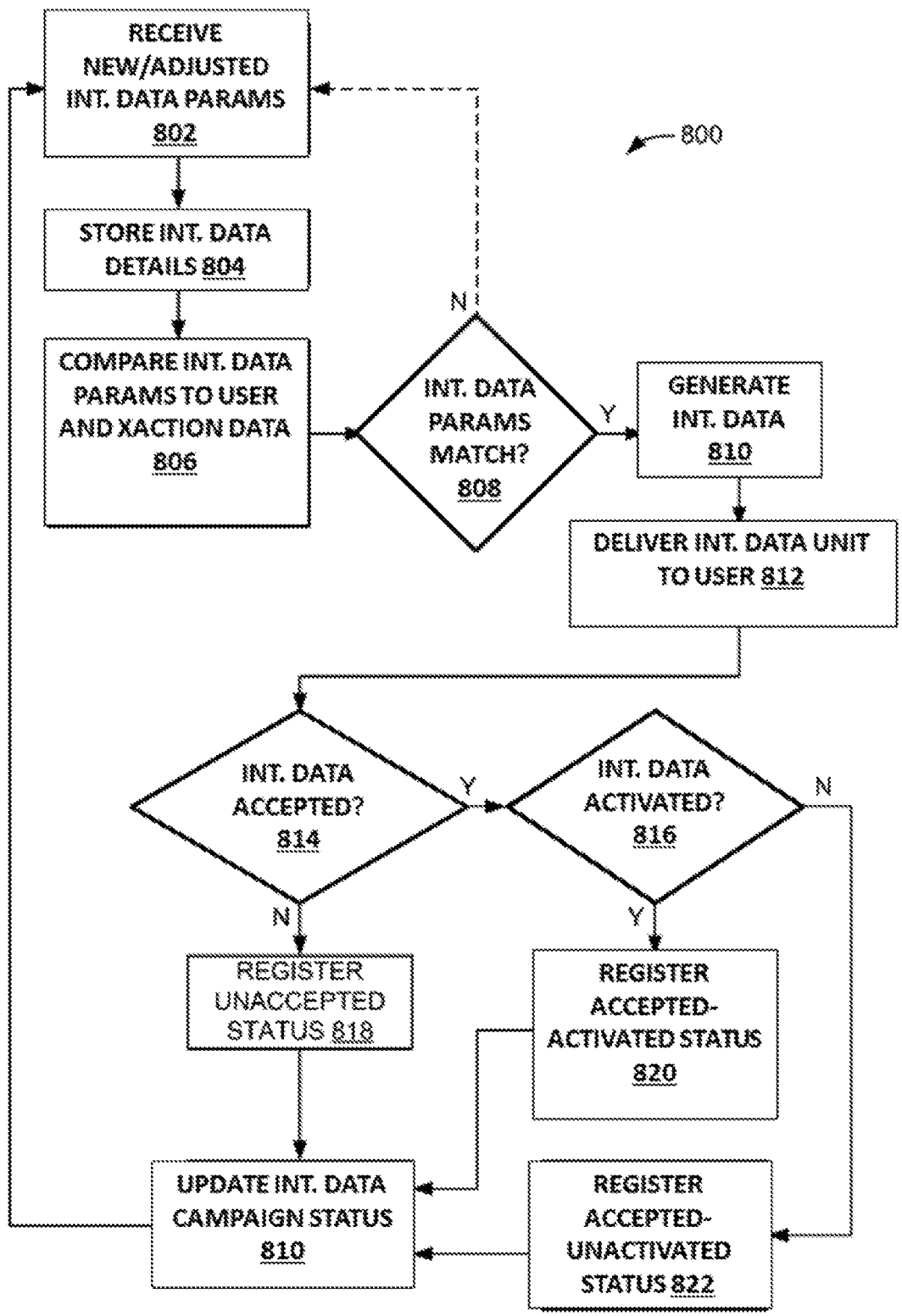
FIG. 8 is flow diagram of an example method of interactive data matching, generation, tracking, and activation.

FIG. 8 is flow diagram of an example method 800 of interactive data matching, generation, tracking, and activation in the transaction and interactive data system 200. In the method 800, the interactive data entry/management system 314 may receive new interactive data units 300 (operation 802) from the interactive data client node 106 via the interactive data UI 202 and the interactive data API 204. The interactive data entry/management system 314 may also store the received interactive data units 300 (operation 804) as interactive data 222 in the interactive data storage 208. The interactive data matching engine 138 may then compare the parameters of the interactive data 222 from the interactive data storage 208 to either or both of the mapped transaction data 226 from the mapped transaction detail data storage 212 and the user data 224 from the user data storage 210 (operation 806), as discussed above.

If the interactive data parameters do not match the user data 224 and/or the mapped transaction data 226 (operation 808) such that at least one user or consumer is qualified to receive the interactive data unit, as determined by the interactive data tracking/verification engine 290, the interactive data client node 106 may modify or adjust the interactive data parameters (operation 802) and store them (operation 804) before the interactive data matching engine 138 continues to compare the interactive data parameters against the mapped transaction data 226 and/or the user data 224 (operation 806). If, instead, the interactive data parameters match the user data 224 and/or the mapped transaction data 226 (operation 808) such that at least one user or consumer is qualified to receive the interactive data unit, the interactive data delivery engine 140 may then generate a proposed interactive data unit 232 for the at least one user or consumer (operation 810) and deliver the proposed interactive data unit 232 (operation 812) via the consumer API 246 to the corresponding consumer client nodes 102.

If a targeted consumer user does not accept the proposed interactive data unit 232 (operation 814), the interactive data tracking/verification engine 290 may register the unaccepted status of the proposed interactive data unit 232 (operation 818) and update a campaign status associated with the proposed interactive data unit 232 (operation 824) accordingly. Instead, if the targeted consumer user accepts the proposed interactive data unit 232 (operation 814), the interactive data tracking/verification engine 290 may then determine if the proposed interactive data unit 232 has been activated by the consumer user (operation 816), such as by detecting whether the consumer user has performed according to the terms of the interactive data unit 232. If so, the interactive data tracking/verification engine 290 may register the proposed interactive data unit 232 as accepted and activated (operation 820) and update the interactive data campaign status accordingly (operation 824). Otherwise, the interactive data tracking/verification engine 290 may register the proposed interactive data unit 232 as accepted but unactivated (operation 822) and update the interactive data campaign status similarly (operation 824). Based on the campaign status that prevails at any particular time, the manufacturer, retailer, or other entity may modify the interactive data parameters of the interactive data unit (operation 802) in order to increase the success of the interactive data campaign.

FIGS. 9A, 9B, 9C, and 9D are graphical representations of an example user interface provided on the consumer client node 102 of FIG. 1. In this example, the consumer client node 102 is a smart phone 102A executing a mobile application (e.g., the consumer agent 104 of FIG. 1) and employing a touch-sensitive display. In other embodiments, similar information illustrated in FIGS. 9A through 9D may be presented in a different format via software executing on a desktop, laptop, or tablet computer serving as the consumer client node 102. In each of FIGS. 9A through 9D, the mobile application displays a set of menu selection buttons 902-908. In this example, the application provides a "new interactive data units" button 902, an "earnings" button 904, a "validate" button 908, and an "other" button 906. Generally, the new interactive data units button 902 may allow the consumer user to view any new interactive data units provided by the transaction and interactive data system 200. The earnings button 904 may provide the consumer user with a list of interactive data units activated with associated earnings, options for how the earnings are to be delivered to the consumer user, and so on. The validate button 908 may provide a mechanism whereby a user may validate item-level transaction data retrieved from paper forms, electronic forms, and other sources described above for processing in the transaction and interactive data system 200. The consumer user may access other functions or operations via the other button 206. While FIGS. 9A through 9D provide one example interface scheme for the consumer client device 102A, many others are possible.

Figure 9A:
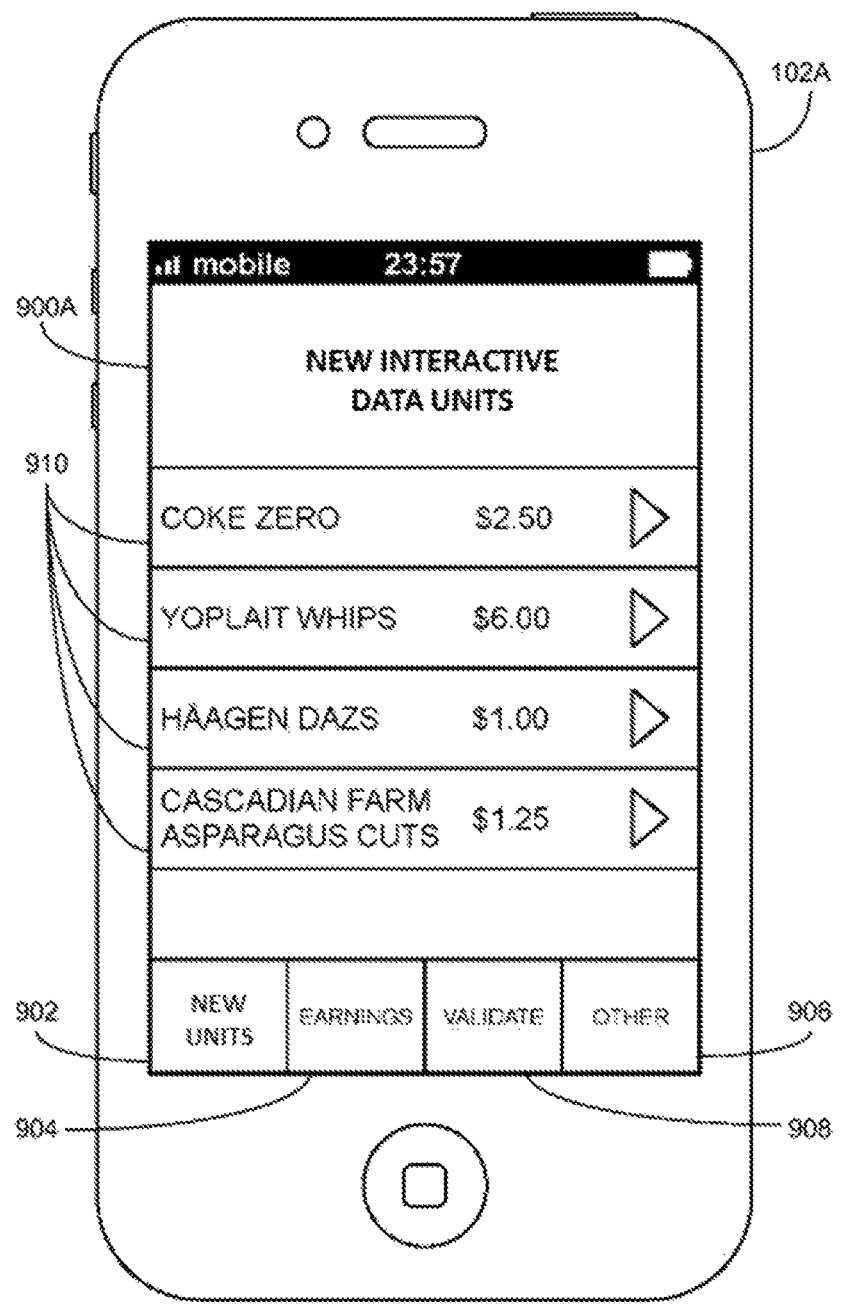
FIGS. 9A, 9B, 9C, and 9D are graphical representations of an example user interface provided on the consumer client node of FIG. 1.

FIG. 9A depicts an example of a new interactive data user interface 900A for display of new interactive data units to the consumer user, presented in one example in response to consumer activation of the new interactive data button 902. The new interactive data interface 900A displays a number of new interactive data units 910 directed to the consumer user associated with the consumer client device 102A, wherein each interactive data unit 910 provides a corresponding activation product (e.g., Coke® Zero) and a total amount that the consumer user may earn (e.g., $2.50 for Coke® Zero) in response to performing according to the terms of the interactive data.

Figure 9B:
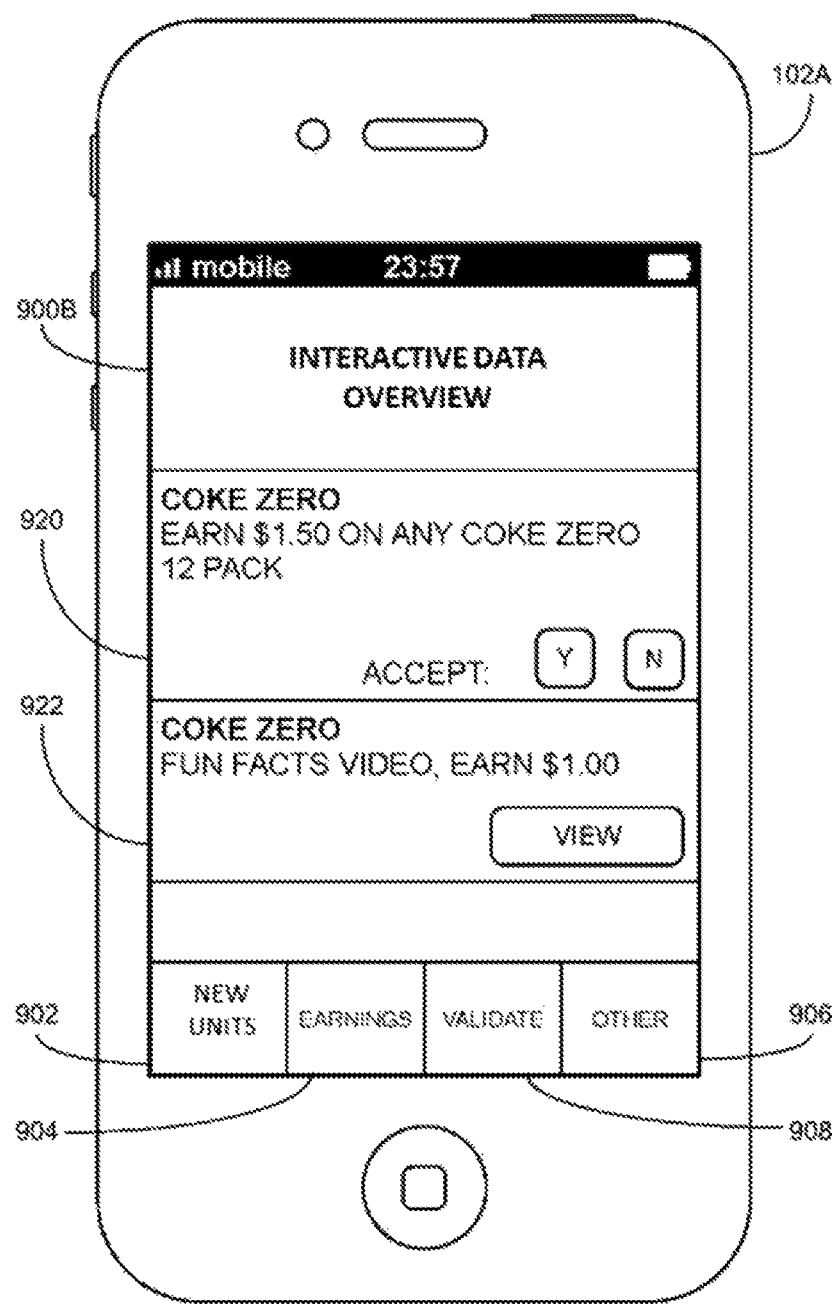
Figure 9C:
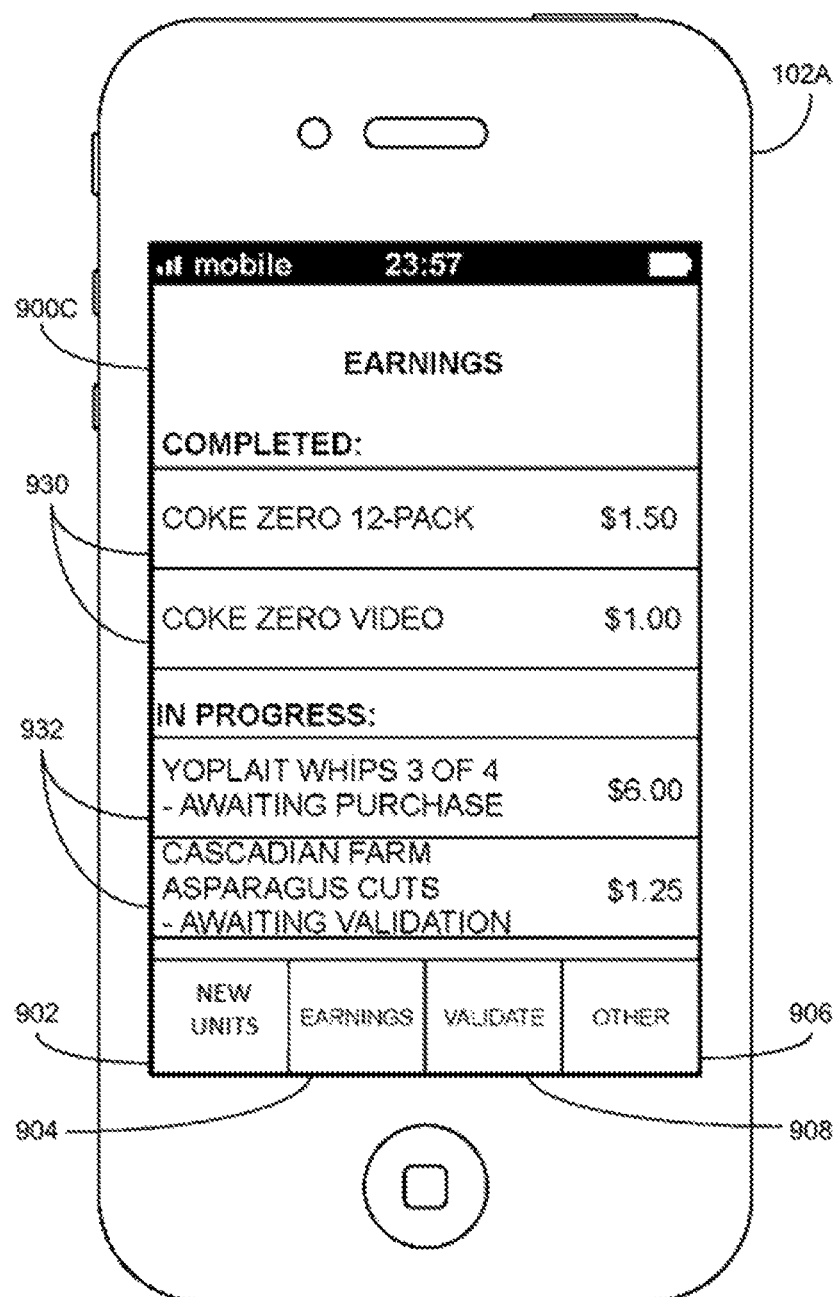

In FIG. 9A, consumer activation of the topmost (Coke® Zero) new interactive data unit 910 may result in the user interface 900B of FIG. 9B being displayed to the user. More specifically, the user interface 900B presents two separate interactive data units 920, 922 associated with Coke® Zero. The upper interactive data unit 920 is an interactive data unit for the consumer user to earn $1.50 on any 12-pack of Coke® Zero. To accept or decline the interactive data unit 920, the consumer user need only activate the corresponding "yes" or "no" button provided in the interface 900B. The second interactive data unit 922 informs the consumer user of the ability to earn $1.00 for viewing a "fun facts" video that imparts some information about the activation product. To activate this interactive data unit 922, the consumer user may activate the "view" button provided, which may then cause the video to be transmitted to, and displayed on, the consumer client device 102A. An interactive data unit may depend on the extent of engagement a user has demonstrated in the past, either with the system 100 as a whole, a particular brand, a type of interactive data unit, or in other ways. For example, a user who demonstrated a greater level of engagement may get an interactive data unit of $1.25 (instead of $1.00) for watching the same "fun facts" video mentioned above.

Presuming the consumer user has activated both Coke® Zero interactive data units presented in FIG. 9B, and the consumer user then activates the earnings button 904, the application may present a user interface 900C that displays both completed Coke® Zero interactive data units 930 and any interactive data units-in-progress 932 accepted by the consumer user. The completed interactive data units 930 may indicate the name or description of the interactive data unit and the amount earned by the consumer user for completing those interactive data units. The interactive data units-in-progress 932 may indicate the products involved, the value of the interactive data unit upon completion, the progress the consumer user has made in completing the interactive data unit (e.g., three or four purchases made), and/or the remaining actions to be taken by the consumer user to complete the interactive data unit (e.g., "awaiting purchase" or "awaiting validation" of the purchase).

Figure 9D:
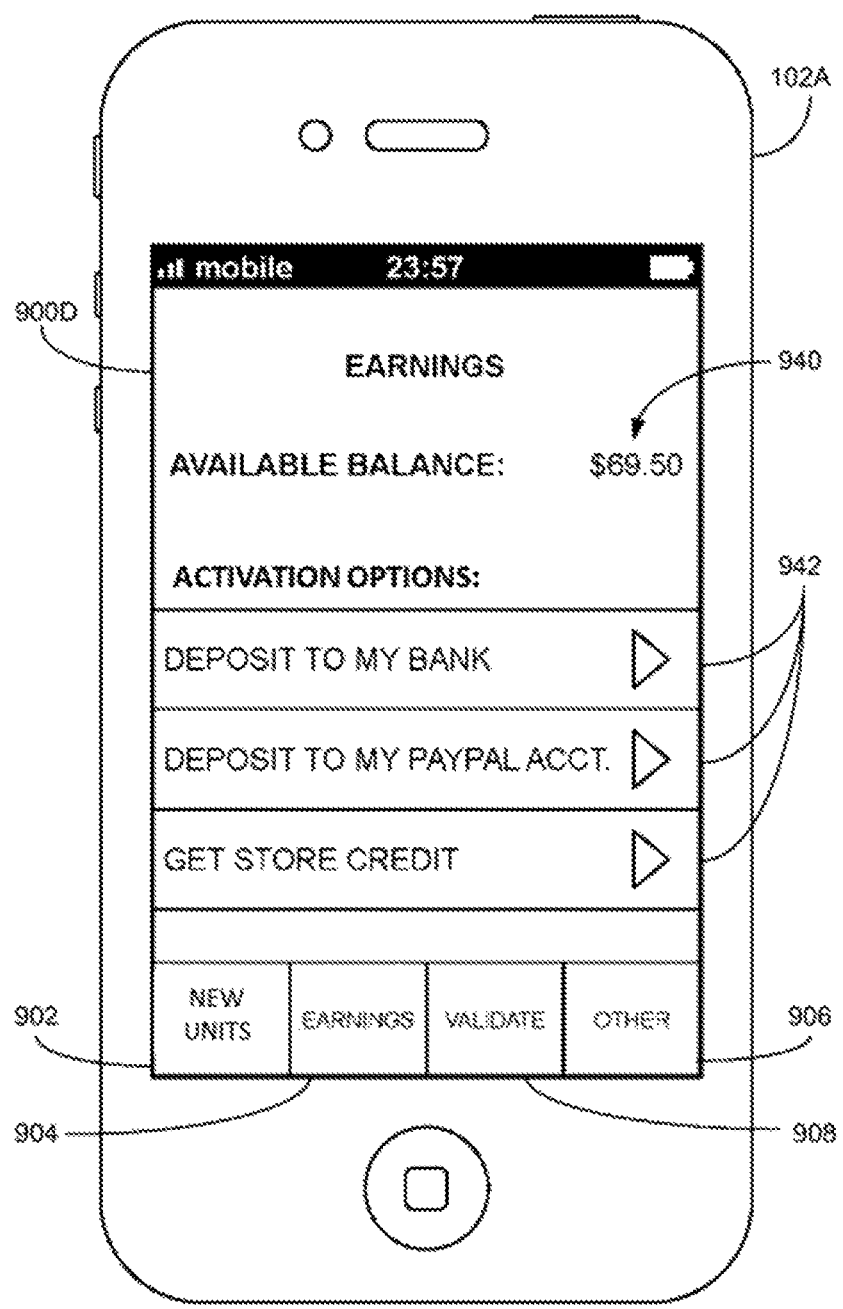

Shown in FIG. 9D, the mobile application may also provide a second user interface 900D in response to the consumer user activating the earnings button 904. In one example, the consumer user may access the second interface 900D by dragging the first interface 900C of FIG. 9C up, down, or to a side of the touch screen of the mobile device 102A. The second interface 900D may present to the consumer user the earned available balance 940 that may be forwarded to the consumer user. The second interface 900D may also present one or more activation options 942 (e.g., "deposit to my bank," "get store credit," etc.), any of which the consumer user may select to determine how the funds or credit are to be delivered to the consumer user.

FIGS. 10A, 10B, 10C, and 10D are graphical representations of an example user interface provided on an interactive data provider client node of FIG. 1. In this particular example, the interactive data provider interface is in the form of an interactive data "dashboard" viewable on a typical desktop or laptop computer system, the dashboard providing the user representing the interactive data provider access to the transaction and interactive data system 200 for defining and previewing specific interactive data units, as well as monitoring the progress of interactive data units and related promotional campaigns.

Figure 10A:
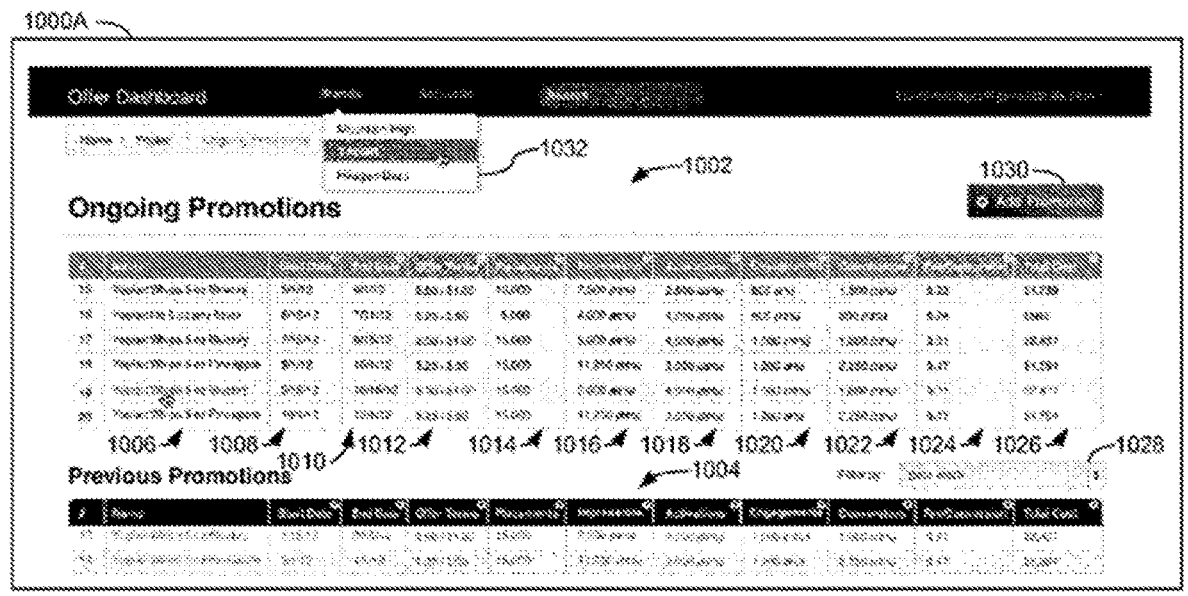
FIGS. 10A, 10B, 10C, and 10D are graphical representations of an example user interface provided on an interactive data provider client node of FIG. 1.

In FIG. 10A, a user interface 1000A provides the user with an overview of both ongoing (in-progress) interactive data promotions 1002 and previous (expired) promotions 1004. In one example, the user can specify the scope of the promotions being displayed by way of a pull-down menu 1032, from which the user may select a particular product or brand. The interface 1000A may then present several metrics for each promotion 1002, 1004 corresponding to the selected product or brand. The metrics may include, in one example, a name 1006 of the product or brand, a start date 1008 and an end date 1010 for the interactive data unit, terms 1012 of the interactive data unit, the number of placements 1014 for the interactive data unit (e.g., the number of consumer users to whom the interactive data unit was delivered), and a number of engagements or interactions 1016, 1018, 1020, 1022 at a number of different of possible engagement levels, as well as a percentage of those engagements relative to the number of placements. In this example, the dashboard presents the number of impressions 1016 of the interactive data unit (e.g., some level of interaction with the interactive data unit, such as viewing, investigation, rejection, etc.), the number of activations 1018 (e.g., the number of acceptances of the interactive data unit), the number of engagements 1020 of the interactive data unit (e.g., at least one product purchased that is required in order to activate the interactive data unit), and the number of conversions 1022 (e.g., the number of interactive data units that were successfully activated by a consumer). The user interface 1000A may also specify a fee 1024 for each conversion and the total cost 1026 of the promotion or campaign.

Also in FIG. 10A, the user may filter the previous promotions 1004 displayed via a filter selection 1028 that may filter the displayed promotions that ended during a desired time period (e.g., the past week or the past month). In other embodiments, the previous promotions 1004 may be filtered and/or ranked according to other criteria, such as conversion percentage, total cost, and so on.

Figure 10B:
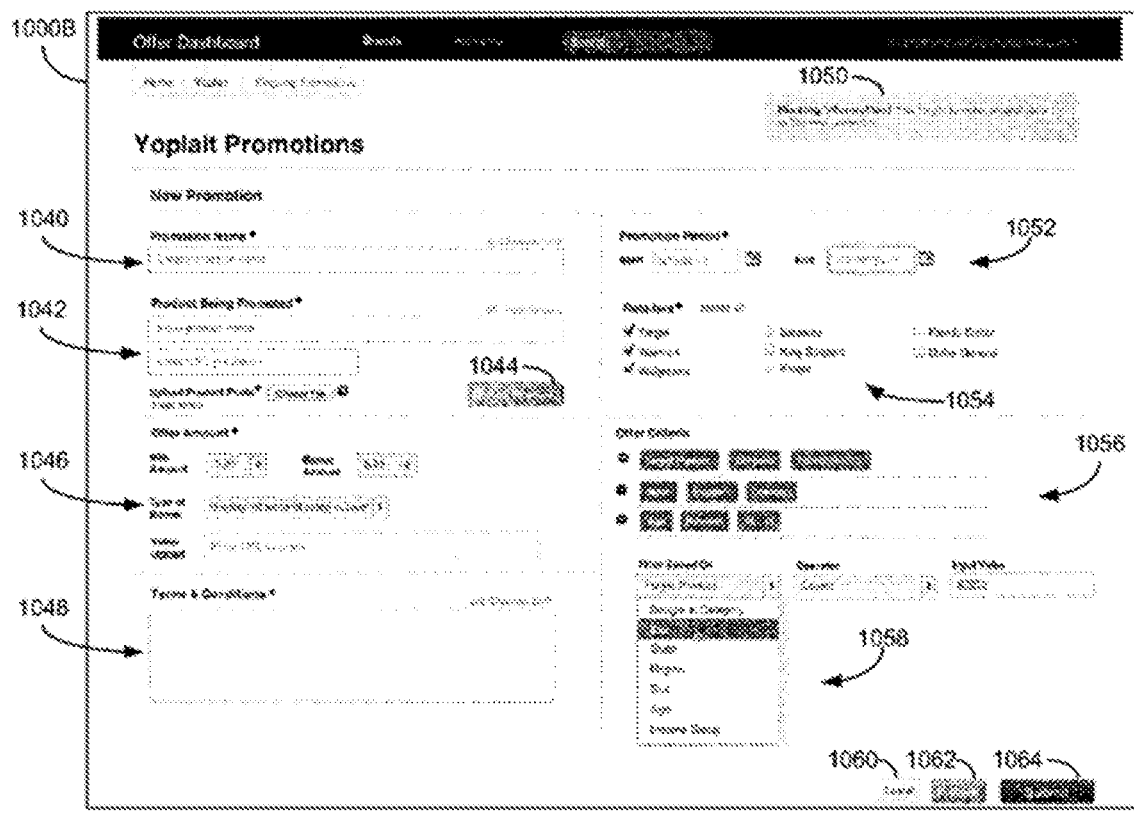

To add a new interactive data unit or promotion via the user interface 1000A, the user may activate an "add promotion" button 1030, to which the transaction and interactive data system 200 may respond by presenting an interactive data entry user interface 1000B depicted in FIG. 10B. In one embodiment, the interactive data entry user interface 1000B may be tailored to the particular product or brand selected in the user interface 1000A of FIG. 10A. As shown in FIG. 10B, the user may specify several aspects or parameters for the interactive data unit, such as the promotion name 1040 and the promoted product 1042. In this implementation, multiple products may be added to the interactive data unit by way of an "add product" button 1044. The user may also specify an interactive data unit amount 1046, including minimum and bonus amounts, the type of activity for the consumer user to complete to earn the bonus (e.g., watch a ten-second video), and other information related to the type of bonus. The user may also specify any other terms and conditions of the interactive data nit in a text box 1048, as well as the promotion period 1052, the retailers 1054 through which the purchase is to occur for activating the interactive data, and the specific interactive data criteria 1056 for delivering the interactive data unit to a user.

As discussed above, the interactive data criteria 1056 may specify the triggering or target product, various characteristics of the target consumer user (such as location and age), and other aspects. As illustrated in FIG. 10B, each of the interactive data criteria 1056 may be specified by one or more pull-down menus 1058. In this case, the user is in the process of indicating that the target consumer user lives in ZIP Code 80202. The user may also remove or delete previously specified criteria 1056 via the "minus" buttons displayed to the left of each interactive data criterion 1056.

Figure 10C:
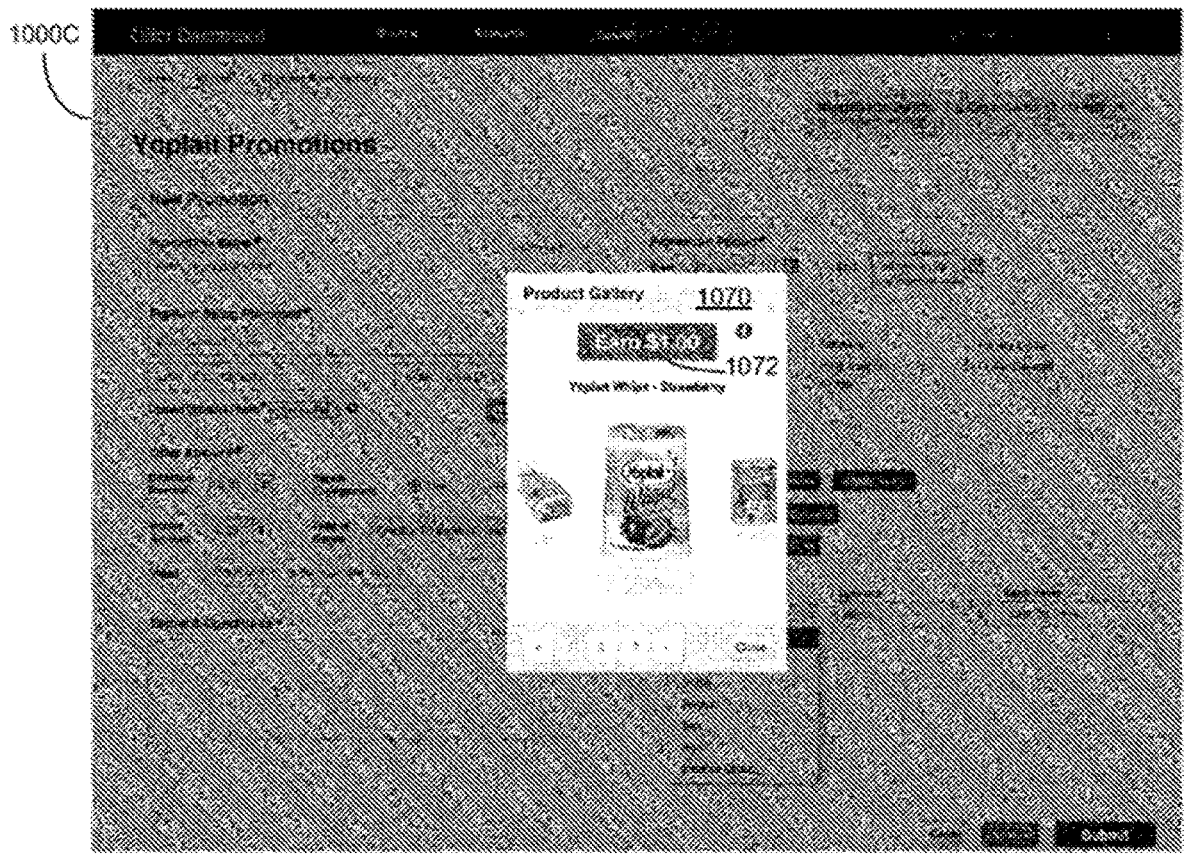

During specification of the interactive data unit, the user may cancel out of the interactive data unit via a cancel button 1060, or submit a finished interactive data unit via a submit button 1064. Current interactive data units may also be modified in a similar fashion in some examples. Prior to submission of the interactive data unit, the user may also activate the preview button 1062 of interface 1000B to view a preview display of the interactive data uni as it will be presented to a targeted consumer user. An example of this interactive data display preview 1070 is shown in FIG. 10C in the context of user interface 1000C. In the particular example, the interactive data entry user interface 1000B is "grayed-out," and the interactive data preview display 1070 is presented to the user. The display of the interactive data unit may include a photo or graphic of the actual product, a description of the product, and an activation or acceptance button 1072 that allows the consumer user to accept the interactive data unit.

Figure 10D:
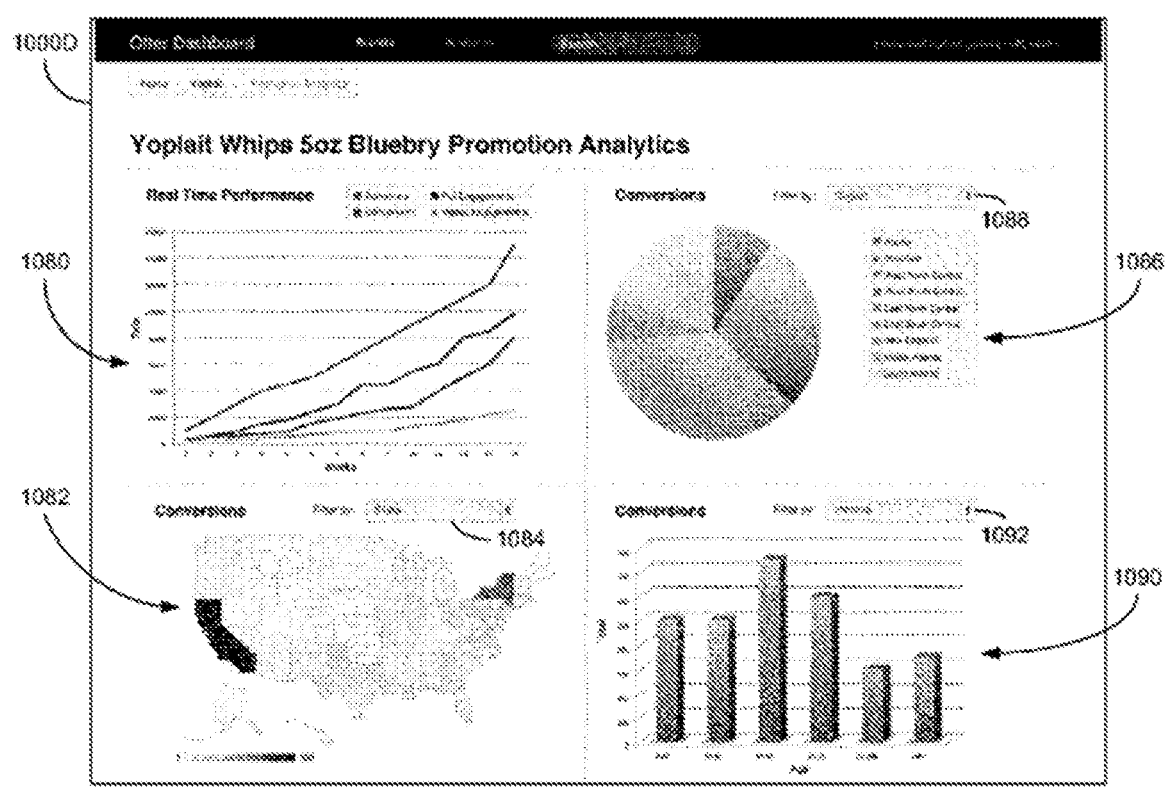

FIG. 10D illustrates a promotion analytics user interface 1000D that allows the user representing a manufacturer or merchant to view several metrics or aspects of an ongoing promotion. In the specific example of FIG. 10D, the promotion analytics user interface 1000D provides a real-time performance graph 1080 that displays the number of activations, poll engagements, video engagements, and conversions of the interactive data unit. Also provided may be a map 1082 of a comparison of a number of relative conversions distinguished by state. The user may also employ a filter selector 1084 of the interface 1000D to display the number of conversions relative to consumer demographics, geographical areas, or other parameters. The interface 1000D may also provide a pie chart 1086 that displays the number of conversions by region (or by other parameters selectable via a filter selector 1088), as well as a bar graph 1090 depicting the number of conversions according to consumer income (or by other characteristics selected via a filter selector 1092). Other ways of presenting conversions or other aspects of an ongoing (or previous) interactive data unit aside from graphs, maps, pie charts, and bar graphs may be employed in the promotion analytics user interface 1000D in other implementations.

In view of at least some of the embodiments described above, the transaction and interactive data system 200 may target purchase interactive data units to a particular consumer user or group of consumer users based on item-level transaction data that may be retrieved from a number of sources, such as consumers, retailers, payment providers, and the like. Such a system may make a promotional campaign involving the purchase interactive data units more successful and efficient, thus benefiting consumers, manufacturers, and merchants alike. Also, by providing timely access to interactive data acceptances and/or activations, the entity providing the interactive data units may alter the various parameters of the interactive data units quickly to further the success of the promotion. Additionally, as the item-level transaction data may describe consumer transactions across multiple retailers or merchants, an entity employing the transaction and interactive data system 200 may employ and experiment with a variety of interactive data strategies for maintaining current customer users, attracting customer users that are new to the market involved, and enticing customer users away from competitors.

Figure 11:
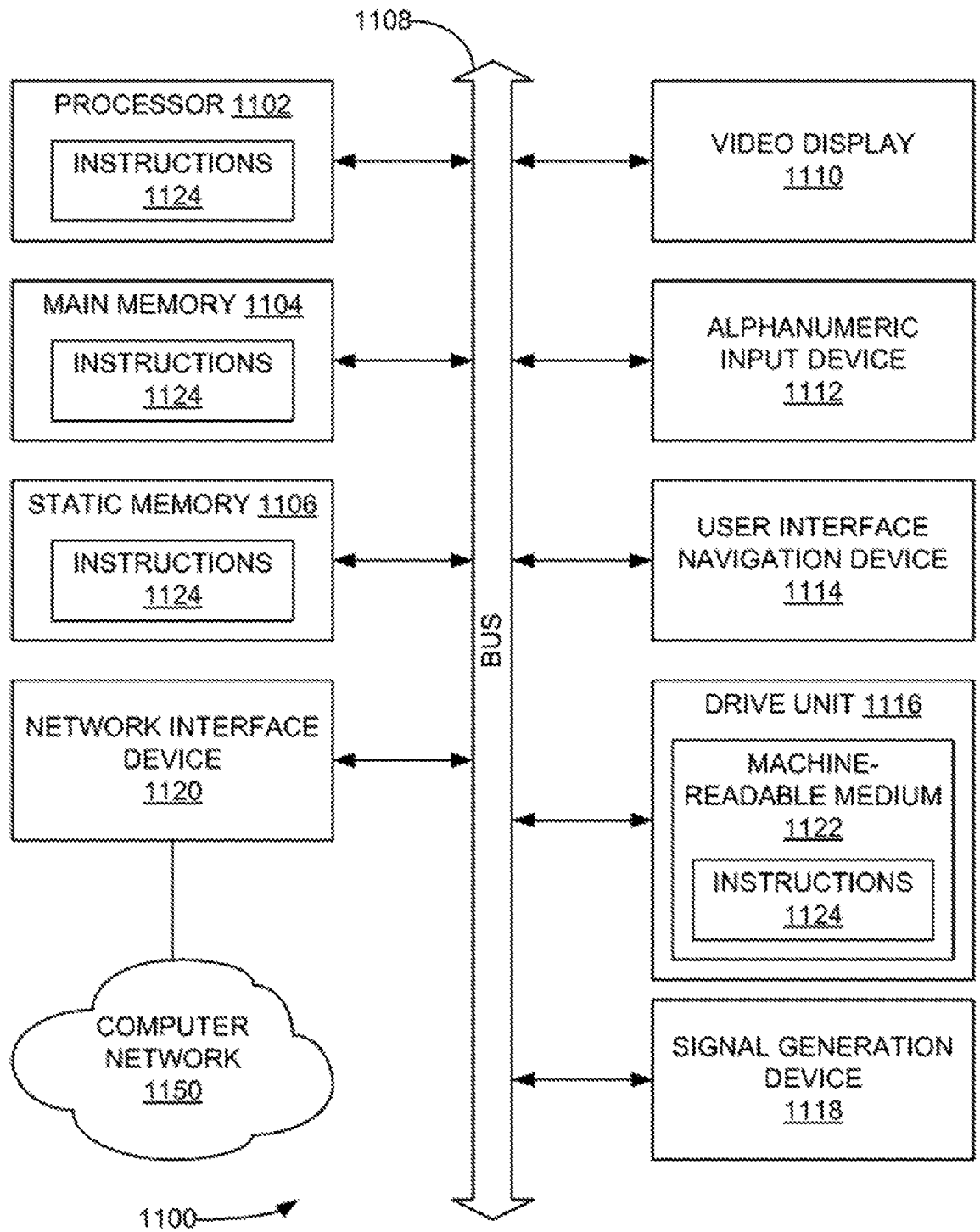
FIG. 11 is a block diagram of a machine in the example form of a processing system within which may be executed a set of instructions for causing the machine to perform any one or more of the methodologies discussed herein.

FIG. 11 depicts a block diagram of a machine in the example form of a processing system 1100 within which may be executed a set of instructions 1124 for causing the machine to perform any one or more of the methodologies discussed herein. More specifically, the processing system 1100 may serve as any of the client nodes 102, 106, 110, the server platform 120, or any portion thereof, as illustrated in FIG. 1. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1100 includes a processor 1102 (e.g., a central processing unit (CPU), a graphics processing unit (GPU), or both), a main memory 1104 (e.g., random access memory), and static memory 1106 (e.g., static random-access memory), which communicate with each other via bus 1108. The processing system 1100 may further include video display unit 1110 (e.g., a plasma display, a liquid crystal display (LCD), or a cathode ray tube (CRT)). The processing system 1100 also includes an alphanumeric input device 1112 (e.g., a keyboard), a user interface (UI) navigation device 1114 (e.g., a mouse), a disk drive unit 1116, a signal generation device 1118 (e.g., a speaker), and a network interface device 1120.

The disk drive unit 1116 (a type of non-volatile memory storage) includes a machine-readable medium 1122 on which is stored one or more sets of data structures and instructions 1124 (e.g., software) embodying or utilized by any one or more of the methodologies or functions described herein. The data structures and instructions 1124 may also reside, completely or at least partially, within the main memory 1104, the static memory 1106, and/or within the processor 1102 during execution thereof by processing system 1100, with the main memory 1104 and processor 1102 also constituting machine-readable, tangible media.

The data structures and instructions 1124 may further be transmitted or received over a computer network 1150 via network interface device 1120 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 1100) or one or more hardware modules of a computer system (e.g., a processor 1102 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1102 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 1102 that is configured using software, the general-purpose processor 1102 may be configured as respective different hardware modules at different times. Software may accordingly configure a processor 1102, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1102 or processor-implemented modules. The performance of certain of the operations may be distributed among the one or more processors 1102, not only residing within a single machine but deployed across a number of machines. In some example embodiments, the processors 1102 may be located in a single location (e.g., within a home environment, within an office environment, or as a server farm), while in other embodiments, the processors 1102 may be distributed across a number of locations.

The system 100 of FIG. 1 and the various components and operations discussed in conjunction with system 100, possibly along with additional modules and databases, may provide functionality beyond that discussed above for the benefit of the various parties, such as the consumer, manufacturer, and/or merchant. For example, the system 100 may allow a user to create a comprehensive personal inventory of the items they have purchased. This inventory may be located in data storage 150 of the system 100 and/or the consumer client node 102 of the user. By querying this data, the consumer user may extract useful information relating to products that the consumer user has purchased. Users may then optimize future purchase decisions by cross-referencing inventory data about their purchased goods with other data, such as, for example, product-specific pricing information, applicable discounts by product and by store, store locations, and product inventories. In one example, the inventory data may include, but are not limited to, the exact make, model number, or product code of each item purchased, the quantity of item purchased, and the price of each item purchased. Additional information associated with the overall purchase or outing, such as the date and location of the transaction, may also be recorded and stored. In some examples, such information may be presented to the user on a computer or mobile device via a personalized webpage, mobile application, or other data presentation mechanism.

In one embodiment, the consumer user may create a comprehensive electronic shopping list based on the personal collected item-level purchase data of the consumer user described above, as well as from item-level purchase data of other consumer users, such as friends, relatives, referrers of products, and others. In addition, the consumer user may specify (either manually or automatically) one or more products from the item-level purchase data of the consumer user or others for subsequent purchase. In one example, the consumer user may query the item-level purchase data to determine where the product was purchased, how much was paid, and so on. Such queries may be based on a UPC, SKU, item description, and/or other means.

The system 100 may then analyze the resulting shopping list, which may be termed "a basket of goods," as mentioned above, to determine where to buy the basket of goods at the lowest overall cost. This analysis may include, for example, comparing prevailing prices at physical stores in the vicinity of the consumer user as well as prices of the products available through online retailers. The system 100 may optimize the basket based on the analysis of some or all of the above criteria, thus determining from which online and/or offline stores each product should be purchased to reduce overall cost. In another embodiment, the user or consumer user may also choose to optimize the basket of goods based on one or more non-price variables, such as, for example, substitute products available for the desired items in the basket, the distance to travel between the home of the consumer user and the various physical stores, the number of physical stores involved in the purchase of the items in the basket, the amount and/or cost of fuel required to travel to or between the physical stores, any delivery charges imposed for purchases from online or offline stores, estimated time until delivery of the purchases, and so on. In one example, the consumer user may suggest or specify any potential substitutes for the items listed in the basket, or the system 100 may suggest such alternatives, either automatically or under the guidance of the consumer user. In addition, these various criteria for optimizing the basket of goods may be weighted by the system 100 and/or the consumer user.

In a related example, the system 100 may retrieve, store, and update data describing fuel costs and consumption for each consumer user or for one or more geographical regions. This system 100 may employ this data to determine the costs of travel between the home of the consumer user and one or more stores. The system 100 may then use these costs to determine overall costs incurred by the consumer user in shopping at one store versus another, whether at a physical store or an online retailer.

In one example, the consumer user may choose to split the shopping list or basket into sublists or subbaskets, one per physical or online store, using the above criteria for pricing the overall set of goods at the lowest total cost. Further, the system 100 may present more than one possible set of subbaskets, allowing the consumer user to choose one for implementation. Additionally, the system 100 may allow the user to "click through" a particular basket or subbasket for an online retailer, thus bringing the consumer user to the associated vendor's checkout page with the items of the basket or subbasket already populated therein and ready for purchase. In examples in which more than one physical store is suggested for purchasing the basket of goods, the stores selected may be based on the home location of the consumer user or the present location of the consumer user. In addition, the system 100 may present to the consumer user the shortest and/or most efficient route to navigate between the physical stores based on the current geographic location of the user and the various stores, possible routes between these locations, estimated travel time between the locations based on current and/or future traffic conditions, and so forth.

In another implementation, the system 100 may store and maintain data describing individual stores, including traditional retail stores, mail-order merchants, online vendors, and the like. This data may include, for example, the physical location, mailing address, website address, and other contact information regarding each merchant. The data may also include information about the inventory of items held by the store, such as a list of products available for purchase, identifying information for each product (e.g., UPC, brief description, category designation, and so on), the volume or quantity in which each product is sold, the name of the manufacturer or producer of the product, the cost of each product, incentives or other promotional interactive data units applicable to each product, delivery and handling charges for each product, delivery time for each product, and whether each product is currently in stock. Examples of incentives include, without limitation, notifications, coupons and alerts. The system 100 may retrieve such information periodically, either electronically or manually, from the various retailers to ensure this data is updated in near-real-time. Another source of such data is the consumer item-level transaction data that the system 100 retrieves for each consumer user associated with the system 100. The system 100 may also compare the various sources of information and the transaction or retrieval times associated therewith to determine the most accurate pricing currently available.

In another implementation, by recording and analyzing the purchase history of a consumer user, the system 100 may determine at what intervals the stock of any particular good previously purchased by the consumer user should be repurchased and remind or alert the consumer user of the need to restock such goods or items. These items may be periodically aggregated into a virtual basket of goods for the consumer user to purchase, possibly according to a schedule that is generated by the system 100 and/or the consumer user.

In another embodiment, the system may analyze data about past and upcoming item-level purchases to provide a summary or more detailed analysis of the personal finances of the consumer users, including budgets, spending habits and so on for more precise allocation of expenses among a number of product categories. For example, instead of allocating to general categories, such as "household" or "groceries," the system 100 may facilitate the definition and use of more specific categories, such as "frozen foods," "produce," "soft drinks," and the like. The consumer user and/or the system 100 may define these categories, depending on the implementation. Additionally, the consumer user may assign and/or revise the various items to the categories, and/or the system 100 may perform those operations automatically. Via the analysis of the purchases relative to these categories, a consumer user may identify personal spending habits and ways to save money through modifications in purchasing habits or patterns, such as by purchasing close substitutes, by purchasing more of the products while on sale, and so on. The system 100 may present results of the analysis to the consumer user by way of tables, charts, graphs, and the like. This data may also be shared with other personal finance applications in some examples.

In some implementations, the system 100 may present a consumer user with visual displays, possibly including games to be played by the consumer user, that reflect the status of the consumer user relative to other consumer users, the progress of the consumer user toward completion of one or more promotional campaigns, past earnings, and other metrics involving the system 100. Such information may compare consumer users that are related or connected via a social network or other means, consumer users of a specific geographic location or area, consumer users of a particular age, income, or demographic group, and the like. Such comparisons may be displayed via a ranking or score associated with the consumer user relative to other consumer users.

The system 100 may also permit a consumer user to electronically transmit shopping lists or virtual baskets of items, or information on individual products that the consumer user has previously purchased, to their friends and other social or business contacts. In another example, the system 100 may enable the consumer user to electronically transmit recommendations of products, baskets, and/or lists of products to friends and other contacts, or view product ratings generated by themselves or others before deciding whether to purchase the same or similar products. Such transmissions of recommendations may be provided via a webpage, email, social network sites, and the like. If the products listed in the recommendation are available via an online retailer, the recommendation may include the identity of the retailer. The recipient of the recommendation may also "click through" the recommendation to access the retailer providing the products. If the products are available at a physical store, the recipient may receive the name of the store, along with directions and other information to aid the recipient in navigating to the store. In another embodiment, the system 100 may permit users who have received a product recommendation to add that item to a personal virtual basket of goods, or import the recommended product into their own inventory data as a "wish list" item.

In other examples, the system 100 may enable consumers to transmit messages containing feedback or reviews to manufacturers and/or retailers about the products they have purchased from within the system 100 or using a computerized interface of another delivery system. This feedback may also be made available to other consumers using the system 100, such as via a website (e.g., a website associated with the consumer user providing the feedback), mobile application, or other mechanism. Such information may also include where the products were purchased, the prices at which the products were obtained, and the like. In some examples, the system 100 may target one or consumer user with polls or questionnaires about shopping habits, a product previously purchased, consumer perceptions concerning a product, and the like. Moreover, the system 100 may provide cash or credits to the consumer user in exchange for the participation of the consumer user in the poll or questionnaire.

In another implementation, the system 100 may enable a consumer user to receive messages and/or other notifications on a personalized website when new information about a product purchased by the consumer user becomes available based on the item-level purchase data associated with the consumer user or on items identified in a personal shopping list or basket of goods. Such information may include, for example, safety or recall information regarding the product, upgrade or repair information specific to the product, news articles pertaining to the product, nutritional information regarding food items, possible substitute or compatible products for particular purchased items, and so forth. Such information may be provided from manufacturers or retailers of the product, or from other sources. Additionally, the consumer user may receive such information via the system 100 regardless of whether the consumer user has registered the product with the manufacturer.

In another embodiment, the system 100 may compile item-level inventory data corresponding to each user or consumer user and generate user-specific spending profiles that allow manufacturers and retailers to determine, for example, what products individual consumer users typically buy, when and where the consumer user buys those products, the frequency at which the consumer users buy the products, how much the consumer users have paid for those products, how far the consumer users have traveled to acquire those products, and whether the consumer users bought the products online or offline. In some examples, the system 100 may also employ the inventory data to determine how price-sensitive or discount-sensitive the consumer users are in response to changing the composition of purchased products based on incentives and other promotional interactive data units.

The system 100 may also compile inventory data from users and aggregate this data to allow manufacturers and retailers to analyze spending habits and purchase trends across designated sub-groups, such as, for example, existing customers, target customers, customers of specific competitors, and customers within a particular geographic distance of particular retail stores.

In another embodiment, the system 100 may enable manufacturers and retailers to determine what prices competitors, such as online competitors, offline competitors, or competitors within some given geographic area, are charging for specific products that they manufacture or sell, or for products that closely resemble products in their own inventory.

The system 100 may also allow manufacturers and retailers to bid on a virtual basket of goods that a consumer user is poised to purchase. Through this reverse auction process, the system 100 may permit manufacturers and retailers to persuade new customers to try their brands, enter their stores for the first time, and/or continue shopping in their stores.

In other examples, the system 100 may enable manufacturers and retailers to measure the success of their promotional interactive data units. For example, manufacturers and retailers may analyze the various item-level purchase data to determine what percentage of consumer users assemble their shopping lists based on goods that are on sale, how deeply a new product must be discounted in order to entice a consumer user to add the product to the virtual basket of the consumer user, and what items a consumer user purchases after arriving in the store that were not original on the shopping list or in the virtual basket.

In another embodiment, the system 100 may provide manufacturers and retailers the ability to gauge which products consumer users are buying online versus offline, and how consumer users balance their desire for more convenient methods of purchasing goods against their desire for lower prices or their need to see and feel goods before purchasing them.

In some instances, the system 100 may compile and aggregate the consumer item-level purchase data to generate a consumer sentiment index that can be used to gauge the level of economic activity and predict future consumer user purchasing trends and similar data related to a particular market or geographical area.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method for delivering interactive data to selective nodes in a computer network, comprising:
    (a) receiving, at a server over the computer network, a plurality of interactive data units from one or more interactive data providers, wherein the plurality of interactive data units is activateable at client nodes, which client nodes comprise mobile electronic devices of a plurality of users, and wherein the plurality of interactive data units comprises activation parameters;
    (b) aggregating user data, by the server, for each user of the plurality of users, wherein each of the plurality of users is associated with a client node comprising a mobile electronic device, and wherein the user data comprises (i) item-level data, received by the server from the mobile electronic devices of the plurality of users, wherein the item-level data is obtained by the mobile electronic device by scanning a physical form, and (ii) user-attribute data, received by the server, wherein the user-attribute data comprises one or more members selected from the group consisting of user identifier information, user contact information, user demographic information, user preference information, and user previous transaction information;
    (c) based at least in part on processing the activation parameters of the plurality of interactive data units with both the item-level data and the user-attribute data, selecting, by the server, at least one of the plurality of users to receive an interactive data unit of the plurality of interactive data units;
    (d) delivering, by the server over the computer network, the interactive data unit to at least one client node associated with the at least one of the plurality of users;
    (e) generating, by the server, activation statistics associated with the interactive data unit; and
    (f) adjusting, by the server, one or more of a plurality of parameters associated with the interactive data unit based at least in part on the activation statistics.

2. The method of claim 1, further comprising, at the at least one client node, activating the interactive data unit upon satisfaction of an activation parameter of the interactive data unit by the at least one of the plurality of users.

3. The method of claim 2, further comprising transmitting activation data to one or more client nodes associated with an interactive data provider of the one or more interactive data providers providing the interactive data unit.

4. The method of claim 2, wherein the user data for the at least one of the plurality of users comprise activity data that satisfies the activation parameter of the interactive data unit.

5. The method of claim 1, further comprising generating an image of the physical form and performing optical character recognition on the image to obtain the item-level data.

6. The method of claim 5, further comprising storing the item-level data for subsequent analysis.

7. The method of claim 1, wherein (b) comprises mapping at least a portion of the item-level data to reference data and generating normalized item-level data.

8. The method of claim 1, further comprising receiving modifications to the plurality of interactive data units from the one or more interactive data providers and delivering the modifications to the at least one client node associated with the at least one of the plurality of users.

9. The method of claim 1, wherein the physical form is a paper form selected from the group consisting of a document, receipt, note, and slip.

10. The method of claim 1, wherein the activation statistics indicate an effectiveness of the interactive data unit delivered to the at least one client node.

11. The method of claim 10, further comprising projecting a completion time of the interactive data unit based at least in part on the effectiveness of the interactive data unit.

12. The method of claim 11, wherein adjusting the one or more of the plurality of parameters associated with the interactive data unit comprises adjusting a completion time of the interactive data unit based on the projected completion time.

13. A computer system for delivering interactive data to selective nodes, comprising:
a network adaptor in communication with client nodes over a network, which client nodes comprise mobile electronic devices of users, wherein each of the client nodes is associated with a user of a plurality of users and user data stored in memory, wherein the user data comprises (i) item-level data, received by the network adaptor from the mobile electronic devices of the plurality of users, wherein the item-level data is obtained by the mobile electronic device of the user by scanning a physical form, and (ii) user-attribute data, received by the network adaptor, wherein the user-attribute data comprises one or more members selected from the group consisting of user identifier information, user contact information, user demographic information, user preference information, and user previous transaction information;
a plurality of interactive data units stored in memory, wherein the plurality of interactive data units is activateable at the client nodes, and wherein the plurality of interactive data units comprises activation parameters; and
one or more processors, individually or collectively, configured to (i) use the network adaptor to deliver an interactive data unit of the plurality of interactive data units to a client node of the client nodes based on processing activation parameters for the interactive data unit with both the item-level data and the user-attribute data of the user associated with the client node; (ii) generate activation statistics associated with the interactive data unit and (iii) adjust one or more of a plurality of parameters associated with the interactive data unit based at least in part on the activation statistics.

14. The computer system of claim 13, wherein the user data of the user comprises activity data that satisfies the activation parameters of the interactive data unit.

15. The computer system of claim 14, wherein the one or more processors, individually or collectively, are configured to transmit activation data to one or more client nodes associated with an interactive data provider providing the interactive data unit.

16. The computer system of claim 13, wherein the one or more processors, individually or collectively, are configured to obtain the item-level data from at least one of an image of the physical form and optical character recognition of the image.

17. The computer system of claim 13, wherein the processing comprises mapping at least a portion of the item-level data to reference data to generate normalized item-level data, and processing the normalized item-level data with the activation parameters for the interactive data unit.

18. The computer system of claim 13, wherein the one or more processors, individually or collectively, are configured to receive modifications to the interactive data unit from an interactive data provider and deliver the modifications to the client node associated with the user.

19. The computer system of claim 13, wherein the physical form is a paper form selected from the group consisting of a document, receipt, note, and slip.

20. The computer system of claim 13, wherein the activation statistics indicate an effectiveness of the interactive data unit delivered to the at least one client node.

21. The computer system of claim 20, wherein the one or more processors, individually or collectively, further configured to project a completion time of the interactive data unit based at least in part on the effectiveness of the interactive data unit.

22. The computer system of claim 21, wherein adjust one or more of the plurality of parameters associated with the interactive data unit comprises adjust a completion time of the interactive data unit based on the projected completion time.

* * * * *